United States Patent
Shmueli et al.

(10) Patent No.: US 7,912,871 B2
(45) Date of Patent: Mar. 22, 2011

(54) INCREMENTAL VALIDATION OF KEY AND KEYREF CONSTRAINTS

(75) Inventors: Oded Shmueli, Nofit (IL); Sharon Krisher, Kiryat Haim (IL)

(73) Assignee: Technion Research and Development Foundation Ltd., Haifa (IL)

( * ) Notice: Subject to any disclaimer, the term of this patent is extended or adjusted under 35 U.S.C. 154(b) by 299 days.

(21) Appl. No.: 11/997,115

(22) PCT Filed: Jul. 27, 2006

(86) PCT No.: PCT/IL2006/000872
§ 371 (c)(1),
(2), (4) Date: Jan. 28, 2008

(87) PCT Pub. No.: WO2007/013079
PCT Pub. Date: Feb. 1, 2007

(65) Prior Publication Data
US 2008/0235251 A1    Sep. 25, 2008

Related U.S. Application Data

(60) Provisional application No. 60/702,626, filed on Jul. 27, 2005.

(51) Int. Cl.
*G06F 7/00* (2006.01)
*G06F 17/30* (2006.01)
(52) U.S. Cl. ..................................................... 707/803
(58) Field of Classification Search .................. 707/803, 707/999.1
See application file for complete search history.

(56) References Cited

U.S. PATENT DOCUMENTS

| 4,710,763 | A  | * | 12/1987 | Franke et al. ................... 345/10 |
| 6,950,985 | B2 |   | 9/2005  | Lee |
| 2005/0120029 | A1 |   | 6/2005 | Tomic et al. |
| 2005/0149729 | A1 | * | 7/2005 | Zimmer et al. ............... 713/168 |
| 2006/0041838 | A1 |   | 2/2006 | Khan |
| 2006/0117073 | A1 | * | 6/2006 | Bosworth et al. ............. 707/201 |
| 2006/0168511 | A1 |   | 9/2006 | Bauer et al. |
| 2007/0112851 | A1 | * | 5/2007 | Tomic et al. ............... 707/104.1 |

OTHER PUBLICATIONS

Kane et al., Consistently Updating XML Documents Using Incremental Constraints Check Queries, ACM 2002., pp. 1-8.
XML Schema keyref Element, www.w3schools.com (Copyright 2009-2010).
Priscilla Walmsley, "Chapter 17: Identity constraints", Defnitive XML Schema, 1st edition (Dec. 7, 2001) Prentice Hall PTR; ISBN: 0130655678.

\* cited by examiner

*Primary Examiner* — Isaac M Woo
*Assistant Examiner* — Van H Oberly
(74) *Attorney, Agent, or Firm* — Browdy and Neimark, PLLC

(57) ABSTRACT

The present invention relates to a method, and system for implementing the method, for performing incremental validation of an XML document with respect to XML Schema key and keyref constraints, and handling the semantics dictated by the XML Schema specification. Several operations are defined that change the content of a document, i.e., add or remove nodes, or change the value of existing nodes. The present invention verifies whether performing such an operation would violate key or keyref constraints, and allows changing the document only if the operation maintains the validity of the document with respect to the constraints. The verification traverses only the parts of the document that may be affected by the change operation, and not the whole document. The invention maintains, in an efficient manner, data structures that hold information relevant to the validation of key and keyref constraints.

25 Claims, 28 Drawing Sheets

| n | ks | isSelectorIdentified |
|---|---|---|
| B1 | (1,2,3) | False |
| B2 | (1,4,5) | True |
| B3 | (2,3,4) | False |

```
Input: Schema S, document D with corresponding data structures, node f,
value newval.
Output: result - VALID or INVALID.

Compute KUpdates and KRUpdates;
UpdateNodes(KUpdates, KRUpdates, f);
// If we got here without exiting with output INVALID, then everything is ok.
return VALID;
```

Fig. 6

```
Input: KUpdates, KRUpdates, f.
Output: None.

currentNode := f;
currentChild := null;
changesInChild := ∅;
while (currentNode ≠ null) {
    changesInNode :=
        UpdateNode_K(currentNode, currentChild,
                     changesInChild, KUpdates);
    UpdateNode_KR(currentNode, KRUpdates);
    currentChild := currentNode;
    changesInChild := changesInNode;
    currentNode := currentNode.parent;
}
```

Fig. 7

Input: A node $y$, a node $x$, a set of changes $changesInChild$, a set of node updates $KUpdates$.
Output: A set of changes.

$changes := \emptyset$;
// $changes$ is passed by reference, and may be changed within $ProcessChanges()$.
$ProcessChanges(y, x, changesInChild, changes)$;
$RelevantUpdates := \{(n, ks, ks') \in KUpdates \mid (n, ks, True) \in y.KeyInfo\}$;
$HandleOldKeySequences(y, RelevantUpdates, changes)$;
$HandleNewKeySequences(y, RelevantUpdates, changes)$;
$y.RemovedSequences := \emptyset$;
for each $(ks, null) \in changes$
    // $null$ means that the entry for $ks$
    // in $y.KeyInfo$ has been removed.
    $y.RemovedSequences += ks$;
return $changes$;

Fig. 8

Input: $node, KRUpdates$.
Output: None.

if $node.KeyrefInfo \neq null$ {
   for each tuple $(n, ks, ks')$ in $KRUpdates$
      if $n$ appears in a record $r \in node.KeyrefInfo$
         // $r$ is $(n, ks)$
         if $ks'$ does not appear in $node.KeyInfo$
           // Once the key-sequence of $n$ changes
           // to $ks'$, there will be no node
           // for $n$ to reference
           exit(INVALID);
         change the key-sequence in $r$ to $ks'$;
      }
   for each $ks \in node.RemovedSequences$
      // $ks$ no longer appears in $node.KeyInfo$
      if $\exists n$ such that $(n, ks) \in node.KeyrefInfo$
         exit(INVALID);
}
$node.RemovedSequences := null$; //reset

Fig. 9

Input: A node $y$; a child node $x$ of $y$; a set of changes in $x$. $changesInChild$; changes in $y$ so far - $changes$ (passed by reference).
Output: None.

$ProcessChanges(y, x, changesInChild, ByRef\ changes)$ {
    for each $(ks, n) \in changesInChild$ {
        if $\exists n'$ such that the set $y.ChildrenKeyInfo[ks]$ contains a tuple $(x, n')$
            // We know that the entry for $ks$ in $x.KeyInfo$ has changed,
            // which means that the tuple $(x, n')$ in $y.ChildrenKeyInfo[ks]$
            // is not up to date.
            remove this tuple;
        if $n \neq null$
            // if $n$ is $null$, it means that there is now no entry for $ks$ in $x.KeyInfo$
            // and thus no reason to add to $y.ChildrenKeyInfo[ks]$.
            // This is not the case here ...
            add the tuple $(x, n)$ to $y.ChildrenKeyInfo[ks]$;
        if $\exists z$ such that $(z, ks, True) \in y.KeyInfo$ {
            if $\exists z$ such that $(z, ks, False) \in y.KeyInfo$ {
                // Here we remove the old record.
                // Later we will check if a (different) record should be added
                // according to $y.ChildrenKeyInfo[ks]$.
                remove $(z, ks, False)$ from $y.KeyInfo$;
                $changes[ks] := null$;
            }
            if $y.ChildrenKeyInfo[ks]$ has exactly one tuple $(c, nodeInC)$ {
                add the record $(nodeInC, ks, False)$ to $y.KeyInfo$;
                $changes[ks] := nodeInC$;
            }
        }
    }
}

Fig. 10

Input: $y$, RelevantUpdates, changes (passed by reference).
Output: None.

HandleOldKeySequences($y$, RelevantUpdates, ByRef changes) {
    for each $(n, ks, ks') \in$ RelevantUpdates
    {
        Remove the record $(n, ks, True)$ from $y.KeyInfo$;
        if $y.ChildrenKeyInfo[ks]$ contains exactly one tuple $(child, nodeInTable)$
        {
            add the record $(nodeInTable, ks, False)$ to $y.KeyInfo$;
            $changes[ks] := nodeInTable$;
            // If an entry for $ks$ already exists in changes, it is replaced.
            // Such an entry may have been added by ProcessChanges.
        }
        else
            $changes[ks] := null$; // This indicated deletion from $y.KeyInfo$.
    }
}

Fig. 11

```
Input: y, RelevantUpdates, changes (passed by reference).
Output: None.

HandleNewKeySequences(y, RelevantUpdates, ByRef changes) {
    for each (n, ks, ks') ∈ RelevantUpdates
    {
        Let r be the record for ks' in y.KeyInfo (null if there is no such record);
        if r ≠ null
        // The new key-sequence already appears in y.KeyInfo.
        {
            if r.isSelectorIdentified = True
                // This means that r existed prior to processing the
                // update, since the previous stages can only add records
                // with isSelectorIdentified = False.
                exit(INVALID);
                // All changes done to the data structures are rolled back
                // and the algorithm exits.
            else //(False)
                remove r from y.KeyInfo;
        }
        // We know that n is a selector-identified node of y,
        // since (n, ks, ks') is in RelevantUpdates.
        add the record (n, ks', True) to y.KeyInfo;
        changes[ks'] := n;
    }
}
```

Fig. 12

```
Input: f_1,...,f_m, KUpdates_1,...,KUpdates_m, JN.
Output: None.

for(i=1; i ≤ m; i++) {
  currentNode := f_i;
  currentChild := null;
  changesInChild := ∅;
  while (currentNode ∉ JN and
         currentNode ≠ null) {
    // UpdateNode_K returns the changes made
    // to the data structures of currentNode
    // (which will become currentChild in
    // the next iteration of the loop).
    changesInNode := UpdateNode_K (
      currentNode, currentChild, changesInChild, KUpdates_i);
    UpdateNode_{K_R}(currentNode, KRUpdates_i);
    currentChild := currentNode;
    changesInChild := changesInNode;
    currentNode := currentNode.parent;
  }
  if currentNode ≠ null
    currentChild.changes := changesInChild;
}
```

Fig. 14

Input: $JN$ (passed by reference), $KUpdates$, $KRUpdates$.
Output: None.

```
r:=2;
while JN ≠ ∅ {
   for each n ∈ JN s.t. rank(n) = r {
      changesInNode := UpdateJNNode_K(n, KUpdates);
      remove n from JN;
      UpdateNode_{KR}(n, KRUpdates);
      currentNode := n.parent;
      currentChild := n;
      changesInChild := changesInNode;
      // Continue up the tree, until we reach
      // either the next join node (which is guaranteed
      // to have a higher rank) or the root.
      while (currentNode ∉ JN and
         currentNode ≠ null) {
         changesInNode :=
            UpdateNode_K(currentNode, currentChild,
                         changesInChild, KUpdates);
         UpdateNode_{KR}(currentNode, KRUpdates);
         currentChild := currentNode;
         changesInChild := changesInNode;
         currentNode := currentNode.parent;
      }
      // Save changes for updating
      // the parent Join Node
      currentChild.changes := changesInChild;
   }
   r++;
}
```

Fig. 15

Input: A node $y$, a set of node updates $KUpdates$.
Output: A set of $changes$.

$changes := \emptyset$;
ProcessChangesJN(y, changes); // $changes$ is passed by reference.
$RelevantUpdates := \{(n, ks, ks') \in KUpdates \mid (n, ks, True) \in y.KeyInfo\}$;
HandleOldKeySequences($y$, $RelevantUpdates$, $changes$);
HandleNewKeySequences($y$, $RelevantUpdates$, $changes$);
$y.RemovedSequences := \emptyset$;
for each $(ks, null) \in changes$
    $y.RemovedSequences+ = ks$;
return $changes$;

Fig. 16

Input: A node $y$; changes in $y$ so far - $changes$.
Output: None.

$ProcessChangesJN(y, ByRef\ changes)$ {
    $changedSequences := \emptyset$;
    for each $c$ in $y.childNodes$
        for each $(ks, n) \in c.changes$ {
            if $ks \notin changedSequences$
                $changedSequences+ = ks$;
            if $y.ChildrenKeyInfo[ks]$ contains a tuple $(c, n')$
                remove this tuple;
            if $n \neq null$
                add the tuple $(c, n)$ to $y.ChildrenKeyInfo[ks]$;
        }
    for each $c$ in $y.childNodes$
        $c.changes := null$;
    for each $ks$ in $changedSequences$
        if there is no $x$ such that $(x, ks, True) \in y.KeyInfo$ {
            if $\exists x$ such that $(x, ks, False) \in y.KeyInfo$ {
                remove $(x, ks, False)$ from $y.KeyInfo$;
                $changes[ks] := null$;
            }
            if $y.ChildrenKeyInfo[ks]$ has exactly one tuple $(c, nodeInC)$ {
                add the record $(nodeInC, ks, false)$ to $y.KeyInfo$;
                $changes[ks] := nodeInC$;
            }
        }
}

Fig. 17

| b1.KeyInfo | | |
|---|---|---|
| n | ks | isSelectorIdentified |
| c1 | 6,2 | true |
| c3 | 5,2 | true |

| b1.ChildrenKeyInfo | |
|---|---|
| (5,2) | (b3,c3),(d,c2) |

| b1.KeyrefInfo | |
|---|---|
| e | 6,2 |

| d.KeyInfo | | |
|---|---|---|
| c2 | 5,2 | false |

| b2.KeyInfo | | |
|---|---|---|
| c2 | 5,2 | true |

| b3.KeyInfo | | |
|---|---|---|
| c3 | 5,2 | true |

| d.ChildrenKeyInfo | |
|---|---|
| (5,2) | (b2,c2) |

Fig. 18

```
Input: p, t.
Output: None.

changesInChild := ∅;
currentNode := p;
currentChild := t;
For each record (n, ks, b) in t.KeyInfo
    changesInChild[ks] := n;
while (currentNode ≠ null) {
    changesInNode :=
        UpdateNode_{New}(currentNode, currentChild, changesInChild);
    currentChild := currentNode;
    currentNode := currentNode.parent;
    changesInChild := changesInNode;
}
```

Fig. 19

Input: A node $y$, a node $x$, a set of changes $changesInChild$.
Output: A set of changes.

$changes := \emptyset$;
// $changes$ is passed by reference, and may be changed within $ProcessChanges()$.
$ProcessChanges(y, x, changesInChild, changes)$;
for each $(n, ks, SN) \in NewKeySelIdent$
   if $y \in SN$ {
      Let $t$ be the record for $ks$ in $y.KeyInfo$ (*null* if there is no such record);
      if $t \neq null$ and $t.isSelectorIdentified = True$
         exit(INVALID);
      if $t \neq null$
         remove $t$ from $y.KeyInfo$;
      add the record $(n, ks, True)$ to $y.KeyInfo$;
      $changes[ks] := n$;
   }
for each $(n, ks, SN) \in NewKeyrefSelIdent$
   if $y \in SN$ {
      if no record for $ks$ exists in $y.KeyInfo$
         exit(INVALID);
      add the record $(n, ks)$ to $y.KeyrefInfo$;
   }
for each $(ks, null) \in changes$
   if a record for $ks$ exists in $y.KeyrefInfo$
      exit(INVALID);
return $changes$;

Fig. 20

```
Input: t.
Output: None.

currentChild := t;
currentNode := t.parent;
for each (n, ks, b) in t.KeyInfo
    changesInChild[ks] := null;
while (currentNode ≠ null) {
    changesInNode :=
        UpdateNode_Deletion(currentNode, currentChild, changesInChild);
    currentChild := currentNode;
    currentNode := currentNode.parent;
    changesInChild := changesInNode;
}
```

Fig. 21

```
Input: A node y, a node x, a set of changes changesInChild.
Output: A set of changes.

changes := ∅;
// changes is passed by reference, and may be changed within ProcessChanges().
ProcessChanges(y, x, changesInChild, changes);
if y ∈ KeySN
    for every node s in NODES_T
        if a record (s, ks, True) appears in y.KeyInfo {
            remove the record from y.KeyInfo;
            changes[ks] := null;
            if y.ChildrenKeyInfo[ks] contains a single tuple (x, c) {
                add the record (c, ks, False) to y.KeyInfo;
                changes[ks] := c;
            }
        }
if y ∈ KeyrefSN
    for every node s in NODES_T
        if a record (s, ks) appears in y.KeyrefInfo
            remove the record from y.KeyrefInfo;
    for every (ks, null) ∈ changes
        if y.KeyrefInfo contains a record for ks
            exit(INVALID);
return changes;
```

Fig. 22

```
<?xml version="1.0" encoding="UTF-8" ?>
<xs:schema elementFormDefault="qualified" attributeFormDefault="unqualified"
    xmlns:xs="http://www.w3.org/2001/XMLSchema">
  <xs:element name="r">
    <xs:complexType>
      <xs:sequence>
        <xs:element ref="a" maxOccurs="unbounded" />
      </xs:sequence>
    </xs:complexType>
  </xs:element>
  <!-- 'a' is the scoping element of 'theKeyref' -->
  <xs:element name="a">
    <xs:complexType>
      <xs:sequence>
        <xs:element ref="d" maxOccurs="unbounded" />
        <!-- 'e' is the target node of 'theKeyref' -->
        <xs:element ref="e" maxOccurs="unbounded" />
      </xs:sequence>
    </xs:complexType>
    <xs:keyref name="theKeyref" refer="theKey">
      <xs:selector xpath="e" />
      <xs:field xpath="f1" />
      <xs:field xpath="f2" />
    </xs:keyref>
  </xs:element>
  <xs:element name="d">
    <xs:complexType>
      <xs:sequence>
        <xs:element ref="c" />
        <xs:element ref="b" maxOccurs="unbounded" />
      </xs:sequence>
    </xs:complexType>
  </xs:element>
  <xs:element name="b">
    <xs:complexType>
      <xs:sequence>
        <xs:element ref="c" maxOccurs="unbounded" />
      </xs:sequence>
    </xs:complexType>
  </xs:element>
  <!-- 'c' is the scoping element of 'theKey' -->
  <xs:element name="c">
    <xs:complexType>
      <xs:sequence>
        <!-- 'c_' is the target node of 'theKey' -->
        <xs:element ref="c_" maxOccurs="unbounded" />
      </xs:sequence>
    </xs:complexType>
    <xs:key name="theKey">
      <xs:selector xpath="c_" />
      <xs:field xpath=".//f1" />
      <xs:field xpath=".//f2" />
    </xs:key>
  </xs:element>
  <!-- 'c_' is the target node of 'theKey' -->
  <xs:element name="c_">
    <xs:complexType>
      <xs:sequence>
        <xs:element ref="x" />
      </xs:sequence>
    </xs:complexType>
  </xs:element>
  <!-- 'e' is the target node of 'theKeyref' -->
  <xs:element name="e">
    <xs:complexType>
      <xs:sequence>
        <xs:element ref="f1" />
        <xs:element ref="f2" />
      </xs:sequence>
    </xs:complexType>
  </xs:element>
  <!-- elements holding the key values -->
  <xs:element name="f1">
    <xs:complexType>
      <xs:simpleContent>
        <xs:extension base="xs:string">
          <xs:attribute name="identifier" type="xs:int" use="required" />
        </xs:extension>
      </xs:simpleContent>
    </xs:complexType>
  </xs:element>
  <xs:element name="f2">
    <xs:complexType>
      <xs:simpleContent>
        <xs:extension base="xs:string">
          <xs:attribute name="identifier" type="xs:int" use="required" />
        </xs:extension>
      </xs:simpleContent>
    </xs:complexType>
  </xs:element>
  <xs:element name="x">
    <xs:complexType>
      <xs:sequence>
        <xs:element ref="x" minOccurs="0" maxOccurs="unbounded" />
        <xs:element ref="f1" minOccurs="0" />
        <xs:element ref="f2" minOccurs="0" />
      </xs:sequence>
    </xs:complexType>
  </xs:element>
</xs:schema>
```

Fig. 24

INCREMENTAL VALIDATION OF KEY AND KEYREF CONSTRAINTS

FIELD OF THE INVENTION

The present invention relates to XML documents and in particular to incremental validation of an update to an XML document with respect to XML schema key and keyref constraints.

BACKGROUND OF THE INVENTION

The bibliographic references marked in the text by numbers within square brackets are listed at the end of the description.

1. Introduction

Over the last few years, the Extensible Markup Language [1] (XML) has become an increasingly popular format of describing hierarchical data. XML is a general-purpose markup language particularly suited for creating special-purpose markup languages that can describe the structure and hierarchy of many types of data files. XML is the lingua franca for information exchange over the Internet, and is also used to represent the internal data of many software systems. XML Schema [2] is a World Wide Web Consortium (W3C) recommendation that provides a mechanism for defining constraints on XML documents. An XML schema is in itself a valid XML document. It is a description of a type of XML documents, expressed in terms of constraints or rules on the structure and content of documents of that type, above and beyond the basic syntax constraints imposed by XML itself. An XML document is considered to be valid in relation to a specific schema if the XML document conforms to a set of constraints or rules defined by that XML schema.

One of the useful mechanisms provided by XML Schema is the ability to define identity constraints, including keys and foreign keys. These constraints, called 'key' and 'keyref', are similar to the 'primary key' and 'foreign key' constraints of databases, but their semantics is more complex due to the hierarchical nature of XML documents.

Key and keyref definitions use XML Path Language (XPath) 1.0 [3] expressions in order to specify paths to relevant nodes of the document. XPath is a concise (non-XML) syntax for addressing portions of an XML document. An XPath expression is a series of navigation steps and predicates. A navigation step leads from a node to its parent, children, descendants or siblings, and may also specify the tag of the desired target node. A predicate may be used to filter the set of nodes returned after the navigation step.

A key definition appears inside an element definition. This element is called the scope of the key. The key definition imposes constraints on the sub-tree of the scoping element. It looks as follows.

```
<xs:key name="KeyName">
  <xs:selector xpath=XPATH_EXPRESSION/>
  <xs:field xpath=XPATH_EXPRESSION/>
  ... [possibly more fields]
</xs:key>
```

The key definition includes a selector expression and one or more field expressions. These are expressions over a simple fragment of XPath [2], called "restricted XPath". They do not contain predicates, and in each path the first location step may be ".//", but the other steps may only be 'self' or 'child' steps. Also, for a field expression the path may end with an attribute. The selector expression is evaluated, with an instance s of the scoping element as a context node, to produce a set of nodes which we call the target node set of s (later we refer to these nodes as the selector-identified nodes of s). For each node in the target node set, every field expression must evaluate (relative to the node) to a node set containing exactly one node, of a simple type. Within an instance of the scoping element, there must not exist two distinct nodes of the target node set that have the same sequence of field values. Let K be a key, defined within the definition of an element e, with selector expression Sel and field expressions f1, . . . , fm. A document D is said to satisfy K if and only if for every instance n of e in D, the following hold. Let S be the set of nodes obtained from evaluating Sel in the context of n (S=Sel(n)). Then:

For each $x \in S$ and for each $f_i$, $i=1 \ldots m$, $f_i$ evaluates to a single, simple-type node in the context of x.

For each $x_1, x_2 \in S$, if $f_i(x_1)=f_i(x_2)$ for each $i=1 \ldots m$ then $x_1$ and $x_2$ are the same node.

A keyref definition is very similar to a key definition. It appears within the definition of a scoping element and specifies selector and field expressions. It looks as follows:

```
<xs:keyref name="KeyrefName" refer="KeyName">
  <xs:selector xpath="XPATH_EXPRESSION/>
  <xs:field xpath="XPATH_EXPRESSION"/>
  ... [possibly more fields]
</xs:keyref>
```

The "refer" attribute specifies the name of the key constraint that this keyref constraint refers to. Let n be an instance of the scoping element of a keyref. For each node u in the target node set of n, there must exist a node v, in some target node set of the referred key that has the same sequence of field values. The exact semantics is explained below.

For a simple example of the usefulness of key and keyref constraints, observe the schema depicted (informally) in FIG. 1. This schema defines a data store of libraries. Each library contains a list of books and a list of checkouts. A book is uniquely identified by the combination of its name and of the name of its author. Assuming in this example that the objective is to ensure the following two conditions:

1. A specific book appears only once within a library (and may have several copies, specified by its NumberOfCopies element).
2. A checkout must reference a book which is listed in the library.

These objectives are achieved by defining, within the scope of the Library element, the following constraints:

1. A key, whose selector expression is .//Book and whose field expressions are ./Name and ./Author.
2. A keyref, whose selector expression is .//Checkout and whose field expressions are ./BookName and ./BookAuthor.

1.1 Terminology

Let K be a key defined within the definition of an element e in a schema S.

Let KSel be the selector expression of K. Let $KField_1, \ldots, KField_k$ be the field expressions of K. Let D be a document.

The instances of e in D are called the scoping nodes of K.

Let n be a scoping node. Let $S_n$ be the set of nodes which is the result of evaluating KSel in the context of n ($S_n$ is sometimes called the "target node set"). Each $x \in S_n$ is a selector-identified node (of n and K). Note that a selector-identified node of K may have several scoping nodes (if it is reachable from several different scoping nodes via the selector expression).

Let x be a selector-identified node of K. If a node f is returned when we evaluate a field expression in the context of x, then we call f a field of x. We call the sequence of values of the nodes returned when evaluating $KField_1, \ldots, KField_k$ in the context of x the key-sequence of x. Note that a node f may be a field of several different selector-identified nodes.

These terms are also used for keyrefs.

1.2 Semantics of Key and Keyref Constraints

The semantics of keyref references, as described in [4], is quite complex:

These references are local to a scoping node of the keyref. Suppose n' is a selector-identified node of a keyref scoping node n. Then a node n" may be considered as being referenced by n' only if n" is a selector-identified node of the key, that has the same field values as n', and at least one of the scoping nodes of n" is either n or a descendant of n.

In a valid document, every selector-identified node of a keyref references (within a scoping node) exactly one selector-identified node of a key. To ensure this, there is a mechanism that resolves conflicts. Let n be a scoping node of a keyref KR that refers to a key K. There is a table, associated with n, which holds K's selector-identified nodes that may be referenced by KR's (or any other keyref that refers to K) selector-identified nodes whose scoping node is n. For each such node the table holds the node's key-sequence (i.e., the values of its fields). In order to construct the table for n, we compute the union of the tables of n's children. Also, if n is a scoping node of K, we add its selector-identified nodes, and key sequences, to the combined table. Then, if the combined table contains two or more rows with the same key-sequence ks (and different nodes), this is considered a conflict. The conflict is resolved as follows. All nodes with key-sequence ks that were added from the children's tables are removed. If there exists a selector-identified node of n with key-sequence ks then it stays in the table. Note that this conflict resolution may result in an empty table (since a key-sequence that appears only in child tables, and appears there more than once, will not appear in n's table).

To illustrate these points, one can observe the document depicted in FIG. 2, where nodes of the document are marked by their tags. Suppose that this document conforms to a schema that defines a key, and a keyref that refers to it. Here, a (i.e., the node whose tag is 'a') is the scoping node of the keyref, and e is its selector-identified node. The c nodes are the scoping nodes of the key, and their c_ children are their selector-identified nodes (i.e., the selector expression is ./c_). The fields of a selector-identified node are its child nodes (whose values are shown in FIG. 2). Note that there are several c_ nodes with the same key-sequence. This does not violate the key constraint because these c_ nodes do not share a scoping node. There are three different c_ nodes in the document whose key-sequence is (3,4). e references the leftmost of these c_ nodes. This is because the key-sequence (3,4) appears in the key tables of both children of d. Therefore, this key-sequence does not appear in the table of d. Thus, this key-sequence appears only in the table of the left child of b. The corresponding c node (marked with a circle in FIG. 2) percolates all the way up to the table of α, and therefore it is the node referenced by e. If one were to change the key-sequence of e to (1,2), the keyref constraint would be violated and the document would become invalid. This is because the key-sequence (1,2) does not appear in d's table (since it appears in the tables of both its children), and thus does not percolate up to α's table. This means that if we change e's key-sequence to (1,2), e will not reference any selector-identified node of the key.

As the popularity of XML increases, as an important tool for data exchange, it becomes more and more important to validate XML documents efficiently, with respect to XML Schema. In order for an XML document to be acceptable for a given application, the XML must be guaranteed to conform to a predefined structure, that is against an XML Schema. Current commercial XML validators enable validation of complete documents, but do not offer a mechanism for manipulating a document and incrementally validating the changes. Some work has been done regarding incremental validation of structural constraints, and also of non-XML Schema identity constraints.

It would be highly desirable to be able to validate only the changes that have been made to an XML document, and not start a validation procedure from scratch, as if the XML document has never been validated before.

It would also be desirable to offer a solution for verifying the validity of only XML Schema key keyref constraints, and in particular to incrementally validate key and keyref constraints only of an updated portion of a document.

SUMMARY OF THE INVENTION

The present invention relates to a method and system for implementing the method, for performing incremental validation of an XML document with respect to XML Schema key and keyref constraints, and handling the semantics dictated by the XML Schema specification. Several operations are defined that change the content of a document, i.e., add or remove nodes, or change the value of existing nodes. The present invention verifies whether performing such an operation would violate key or keyref constraints, and allows changing the document only if the operation maintains the validity of the document with respect to the constraints. The verification traverses only the parts of the document that may be affected by the change operation, and not the whole document. The invention maintains, in an efficient manner, data structures that hold information relevant to the validation of key and keyref constraints.

Thus, the present invention provides a method for updating an XML document and validating the update in an incremental fashion with respect to XML schema key and keyref constraints, said method comprising:

(i) defining an XML schema comprising key and keyref constraints;

(ii) validating an XML document conforming to the XML schema and comprising a key element and a keyref element in accordance with the key and keyref constraints;

(iii) specifying an update, including one or more operations, to be made to the XML document;

(iv) verifying that said update does not violate any key or keyref constraints; and (v) performing said update only after the verification of (iv) is successful, otherwise undoing said update.

Examples of such operations that introduce changes to an XML document include but are not limited to:

(a) adding a new node;

(b) deleting a node;

(c) changing the value of a node;

(d) moving a node to a new location;

(e) copying a node to a new location;
(f) adding a new subtree;
(g) deleting a subtree;
(h) moving a subtree to a new location; and
(i) copying a subtree to a new location.

Data structures are maintained to capture the state of the document with respect to key and keyref constraints. The data structures are designed to enable efficient monitoring as the document changes. For example, the KeyFieldInfo and KeyrefFieldInfo structures enable us to know which selector-identified nodes are affected by changing a simple-type node, i.e., which key-sequences change as the value of the node changes. The KeySelIdent and KeyRefSelIdent structures allow us to check whether a given node is a selector-identified node, and if so, of which scoping nodes. They also allow us to keep the key-sequence of each selector-identified node only once, even if the node has several scoping nodes.

For a keyref scoping node n, the n.KeyrefInfo structure is quite straight forward—it holds n's selector identified nodes and their key-sequences. That way, if the key-sequence of one of these nodes changes, or if the key-sequence of a referenced node changes, we do not have to re-calculate these key-sequences, but rather update them (if needed), and check the validity of the references.

The x.KeyInfo structures (for each node x) are needed in order to check the validity of references. If x is a keyref scoping node then, in order for the document to be valid, each key-sequence in x.KeyrefInfo must also appear in x.KeyInfo. x.KeyInfo is also important if x is a key scoping node, since we can make sure that, following a change in the document, there are no duplicate key-sequences in x.KeyInfo (if there are, then the key is violated). x.KeyInfo is maintained even if x is not a key or keyref scoping node, because the content of a node's KeyInfo structure is affected by the KeyInfo structures of the node's children (as described in the definition of the KeyInfo structure, and dictated by the semantics of XML Schema constraints).

The x.ChildrenKeyInfo structures (for each node x) allow us to easily update the KeyInfo structure of a node x following an update to one or more of its children's KeyInfo structures. For each key-sequence ks that appears in the KeyInfo structure of at least one child of x, x.ChildrenKeyInfo tells us in which children's KeyInfo structures ks appears, and to which selector-identified nodes it belongs. Thus, when the entry for ks in some child changes, we can update the entry for ks in x.KeyInfo according to the current states of x.ChildrenKeyInfo and x.KeyInfo. Basically, x. ChildrenKeyInfo saves us the trouble of having to check the KeyInfo structures of all of x's children when the structure of one of the children is updated.

BRIEF DESCRIPTION OF THE DRAWINGS

FIG. 6 shows an algorithm for changing the value of a simple-type node.

FIG. 7 shows the UpdateNode (KUpdates, KRUpdates, f) function, which uses the functions UpdateNode$_K$ and UpdateNode$_{KR}$ in order to update the data structures associated with a single node.

FIG. 8 shows the UpdateNode$_K$ (y, x, changesInChild, KUpdates) function which updates y.KeyInfo and y.ChildrenKeyInfo, and also inserts the appropriate key-sequences into y.RemovedSequences.

FIG. 9 shows the UpdateNode$_{KR}$(y, KRUpdates) function which updates the KeyrefInfo structure of a node according to the received key-sequence changes (KRUpdates) and also checks whether all references are valid.

FIG. 10 shows the ProcessChanges function.

FIG. 11 shows the HandleOldKeySequences function.

FIG. 12 shows the HandleNewKeySequences function.

FIG. 14 shows the BeforeJN function which searches for the first Join Node on the way from Node $f_i$ to the root.

FIG. 15 shows the FromJN function which updates all nodes on the tree from the previously found Join Nodes to the next Join Node.

FIG. 16 shows the UpdateJNNode$_K$ function which handles changes propagated through possibly several children.

FIG. 17 shows the ProcessChangesJN function which processes the changes received from possibly several children.

FIG. 18 shows KeyInfo, ChildrenKeyInfo and KeyrefInfo structures after the update.

FIG. 19 shows the Update$_{New}$(p, root(T)) function which updates the KeyInfo, ChildrenKeyInfo and KeyrefInfo structures of existing nodes.

FIG. 20 shows the UpdateNode$_{New}$ function which is called by the Update$_{New}$(p, root(T)) function.

FIG. 21 shows the Update$_{Deletion}$ function which updates the data structures (KeyInfo, ChlildrenKeyInfo and KeyrefInfo) of the nodes along the path from t.parent to root(D).

FIG. 22 shows the UpdateNode$_{Deletion}$ function which is called by the Update$_{Deletion}$ function in order to update the data structures of a single node.

FIG. 24 shows the schema used for validation experiments.

DETAILED DESCRIPTION OF THE INVENTION

Figure 1:
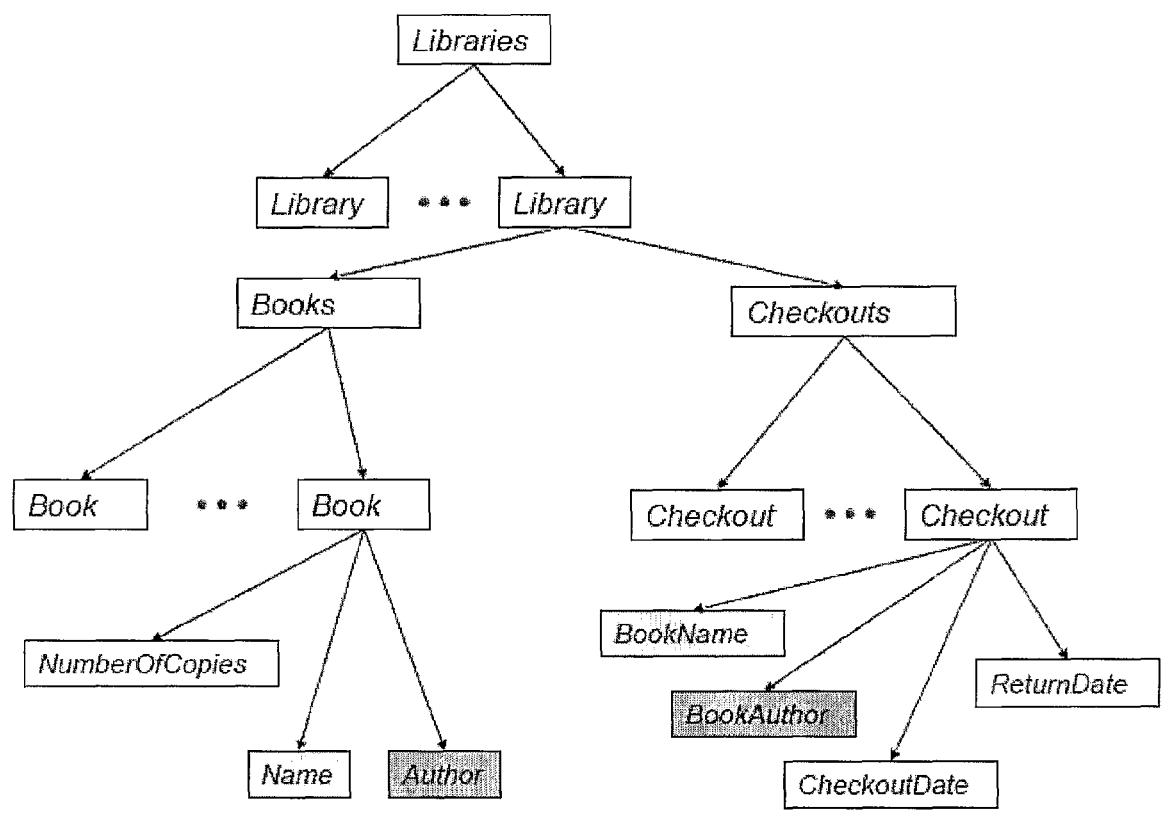
FIG. 1 is a simple example of key and keyref constraints as known in the art.
Figure 2:
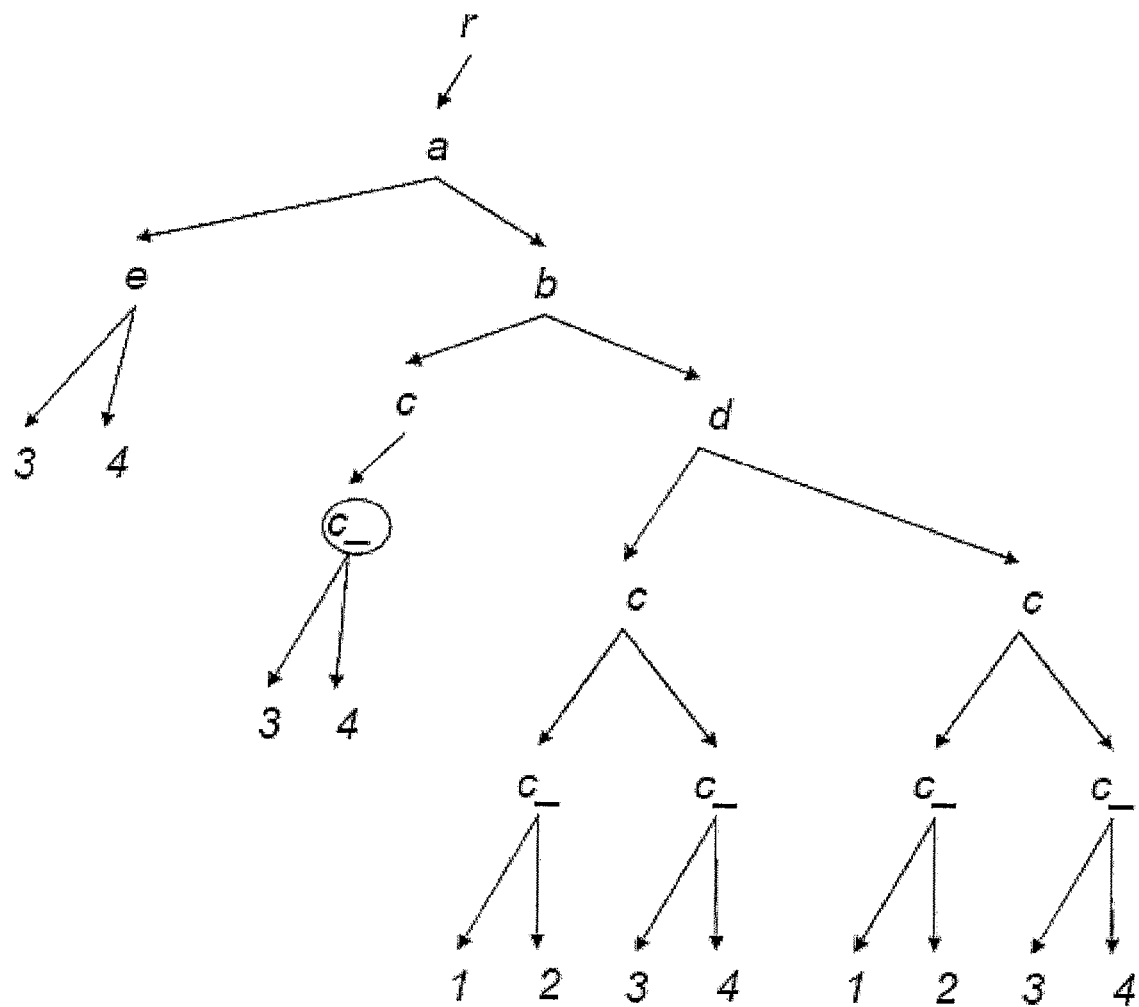
FIG. 2 illustrates semantics of key and keyref constraints as known in the art.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention relates to a method and system for updating an XML document and then incremental validating the update with respect to XML Schema key and keyref constraints. The validation process does not validate the entire XML document from scratch but rather verifies only the portions of the XML document that are potentially affected by the update.

The present invention further provides a system for updating an XML document and incrementally validating the update with respect to XML schema key and keyref constraints, said system comprising:
 (i) an XML schema comprising key and keyref constraints;
 (ii) an XML document validated as conforming to the XML schema and comprising a key element and a keyref element in accordance with the key and keyref constraints;
 (iii) an update, including one or more operations, to be made to the XML document;
 (iv) means for verifying that said update does not violate any key or keyref constraints; and
 (v) means for performing said update only after the verification of (iv) is successful.

2. Incremental Validation

2.1 Motivation

As the popularity of XML increases, it becomes more and more important to validate XML documents efficiently, with respect to XML Schema. Current commercial XML validators enable validation of complete documents, but do not offer a mechanism for manipulating a document and incrementally validating the changes. Some work has been done regarding incremental validation of structural constraints, and also of non-XML Schema identity constraints.

The present invention provides a method and algorithms that perform incremental validation with respect to XML Schema key and keyref constraints, and handle the semantics dictated by the XML Schema specification. We define herein several operations that change the content of a document, i.e., add or remove nodes, or change the value of existing nodes, present algorithms that check whether performing such an operation would violate key or keyref constraints, and change the document only if the operation maintains the validity of the document with respect to the constraints. These algorithms traverse only the parts of the document that may be affected by the change operation, and not the whole document. They maintain, in an efficient manner, data structures that hold information relevant to the validation of key and keyref constraints.

2.2 Incremental Validation Overview

Several update operations on XML documents are defined.

2.2.1 Assumptions

We assume that these operations are executed on a document D that is valid with respect to an XML Schema S that defines a key constraint K and a keyref constraint KR. For simplicity, we assume one key and one keyref constraint. Our algorithms can be easily extended to handle multiple key and keyref constraints. We denote the sizes (in terms of the number of characters in the text representation) of the document and the schema by jDj and jSj, respectively. We assume that the document has an in-memory DOM-like representation [8] (that uses Node objects), and that every node in the document has a unique node identifier.

2.2.2 Some Suggested Operations

We suggest the following operations as an example. For each one we present an algorithm that performs the operation on the document, but undoes any changes if the operation causes a violation of the key or keyref constraints.

Changing the value of a simple-type node: ChangeValue (f, newval), where f is some simple-type node and newval is the value to be assigned to it.

Changing the values of a set of simple-type nodes: ChangeValues$(($f$_1$, newval$_1)$, ..., $($f$_m$, newval$_m))$, where for $0 \leq i \leq m$, f$_i$ is some simple-type node and newval$_i$ is the value to be assigned to it. This operation is transactional, i.e., either all changes are made or no change is made (if performing all changes leaves the document in an invalid state).

Adding a subtree: AddSubTree(p, T, i), where p is a node in the document D and T is a data tree. The root of T is to be added as the i'th child of p.

Deleting a subtree: Delete(t), where t is some node. The operation deletes the subtree T, rooted at t, from the document.

Figure 3:
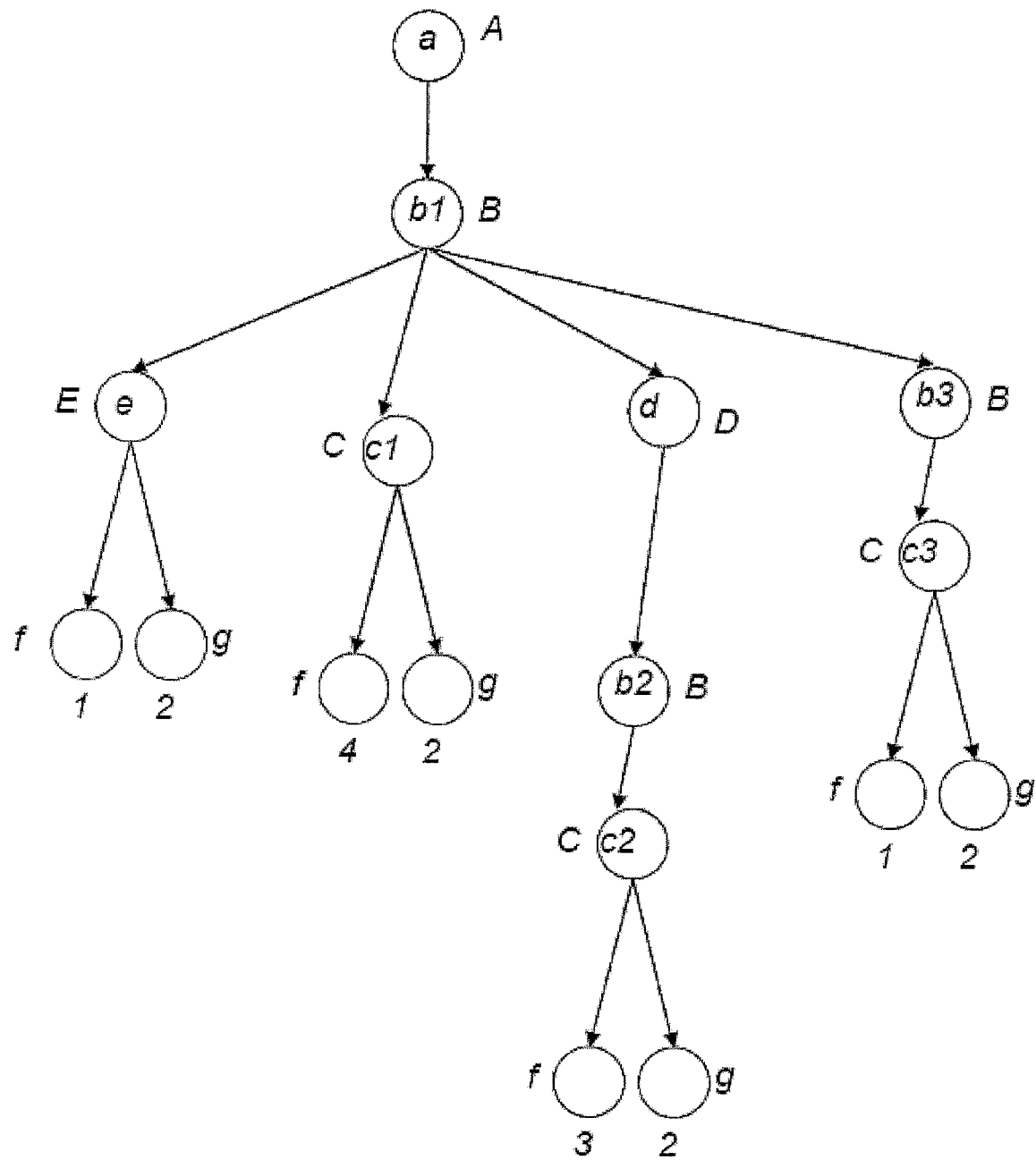
FIG. 3 is an example document serving to illustrate key and keyref constraints.

We demonstrate the data structures and algorithms on the document depicted in FIG. 3. We refer to nodes by the names written inside the circles. Node tags are written next to them. Consider a key constraint whose scoping nodes are the B nodes, whose selector is ./C\./B/C and whose fields are ./f and ./g. It ensures that within a B node, there are no two child or grandchild C nodes with the same combination of f and g values (i.e., in this document, c1 and c3 must have unique (f, g) values, because they are a child and a grandchild of b1). Consider a keyref constraint (that refers to this key) whose scoping nodes are the B nodes, whose selector is ./E and whose fields are ./f and ./g. It ensures that if an E node appears as a child of some B node then there is some C node, within the scope of this B node or one of its descendant B nodes that has the same f and g values as the E node.

2.3 Data Structures

Data structures are maintained to capture the state of the document with respect to key and keyref constraints. Algorithms of the invention maintain these structures.

2.3.1 Motivation for Maintaining the Data Structures

The data structures are designed to enable efficient monitoring as the document changes. The KeyFieldInfo and KeyrefFieldInfo structures enable us to know which selector-identified nodes are affected by changing a simple-type node, i.e., which key-sequences change as the value of the node changes. The KeySelIdent and KeyRefSelIdent structures allow us to check whether a given node is a selector-identified node, and if so, of which scoping nodes. They also allow us to keep the key-sequence of each selector-identified node only once, even if the node has several scoping nodes.

For a keyref scoping node n, the n.KeyrefInfo structure is quite straight forward—it holds n's selector identified nodes and their key-sequences. That way, if the key-sequence of one of these nodes changes, or if the key-sequence of a referenced node changes, we do not have to re-calculate these key-sequences, but rather update them (if needed), and check the validity of the references.

The x.KeyInfo structures (for each node x) are needed in order to check the validity of references. If x is a keyref scoping node then, in order for the document to be valid, each key-sequence in x.KeyrefInfo must also appear in x.KeyInfo. x.KeyInfo is also important if x is a key scoping node, since we can make sure that, following a change in the document, there are no duplicate key-sequences in x.KeyInfo (if there are, then the key is violated). X.KeyInfo is maintained even if x is not a key or keyref scoping node, because the content of a node's KeyInfo structure is affected by the KeyInfo structures of the node's children (as described in the definition of the KeyInfo structure, and dictated by the semantics of XML Schema constraints).

The x. ChildrenKeyInfo structures (for each node x) allow us to easily update the KeyInfo structure of a node x following an update to one or more of its children's KeyInfo structures. For each key-sequence ks that appears in the KeyInfo structure of at least one child of x, x. ChildrenKeyInfo tells us in which children's KeyInfo structures ks appears, and to which selector-identified nodes it belongs. Thus, when the entry for ks in some child changes, we can update the entry for ks in x.KeyInfo according to the current states of x.ChildrenKeyInfo and x.KeyInfo. Basically, x. ChildrenKeyInfo saves us the trouble of having to check the KeyInfo structures of all of x's children when the structure of one of the children is updated.

2.3.2 Definitions of the Data Structures

Note that the definition of the data structures allows for multiple key and keyref constraints. Each data structure has an instance for each key or keyref constraint, depending on the data structure. For example, for each key constraint $K_i$ defined in the schema, there is a data structure $KeySN[K_i]$. However, our algorithms assume a single key constraint and a single keyref constraint. Thus, for example, the algorithms use KeySN to refer to KeySN[K], where K is the single key constraint defined in the schema.

KeySN (short for KeyScopingNodes): This is a global data structure, i.e., exists per document, and not per node. For each key K, KeySN[K] contains the scoping nodes of K. In order to enable checking efficiently whether a given node is a scoping node, KeySN[K] is maintained as a search tree over node identifiers. For a scoping node n, we also keep the distance (i.e., number of edges in the document tree) of n from the root of the document, and denote it KeySN[K][n].

KeyrefSN (short for KeyrefScopingNodes): This is a global data structure. For each keyref KR, KeyrefSN[KR] contains the scoping nodes of KR. In order to enable checking efficiently whether a given node is a scoping node, KeyrefSN[KR] is maintained as a search tree over node identifiers. For a scoping node n, we also keep the distance (i.e., number of edges in the document tree) of n from the root of the document, and denote it KeyrefSN[KR][n].

KeySelIdent (short for KeySelectorIdentifiedNodes): This is a global data structure. For each key K, KeySelIdent[K] contains a record (s, ks, SN) for each selector-identified node s of K, where ks is the key-sequence of s and SN is a list of s's scoping nodes, ordered by distance from the root (all these scoping nodes are ancestors of s, and therefore on the path from the root to s). In order to enable fast access to the record of a node s, KeySelIdent[K] is maintained as a search tree over node identifiers.

KeyrefSelIdent (short for KeyrefSelectorIdentifiedNodes): This is a global data structure. For each keyref KR, KeyrefSelIdent[KR] contains a record (s; ks; SN) for each selector-identified node s of KR, where ks is the key-sequence of s and SN is a list of s's scoping nodes, ordered by their distance from the root (all these scoping nodes are ancestors of s, and therefore on the path from the root to s). In order to enable fast access to the record of a node s, KeySelIdent[K] is maintained as a search tree over node identifiers.

KeyFieldInfo: This is a global data structure. For each key K, KeyFieldInfo[K] contains a tuple (f, occurrences) for every node f that appears as a field of some selector-identified node. occurrences is a set of tuples of the form (s, i), where s is a selector-identified node of K such that f is the i'th field of s (i.e., the i'th field expression of K evaluates to {f} in the context of s). KeyFieldInfo[K] is maintained as a search tree over node identifiers (to facilitate searching for field nodes).

KeyrefFieldInfo: This is a global data structure. For each keyref KR, KeyrefFieldInfo[KR] contains a tuple (f, occurrences) for every node f that appears as a field of some selector-identified node. occurrences is a set of tuples of the form (s, i), where s is a selector-identified node of KR such that f is the i'th field of s (i.e., the i'th field expression of K evaluates to {f} in the context of s). KeyrefFieldInfo[KR] is maintained as a search tree over node identifiers (to facilitate searching for field nodes).

x.KeyInfo: This is a local data structure, i.e., there are multiple instances of this data structure, associated with document nodes. This data structure exists for each node in the document, though it may be empty for some of the nodes. For a key K and a node x, x.KeyInfo[K] contains records of the form (n, ks, isSelectorIdentified), where:

n is a selector-identified node of the key K that is a descendant of x, or x itself (in the case where x is both a scoping node and a selector-identified node of itself).

ks is the key-sequence of n.

isSelectorIdentified is a Boolean value.

There are no two records with the same key-sequence in x.KeyInfo. x.KeyInfo[K]={(n,ks,True)| x is a scoping node of K, n is a selector-identified node with key-sequence ks in the scope of x} ∪ {(n,ks,False)| There is no selector-identified node of K with key-sequence ks and scope x, there is a child z of x and a Boolean b such that (n,; ks, b) ∈ z.KeyInfo[K] and there is no child z'≠z and a Boolean b' such that (n, ks, b') ∈ z'.KeyInfo[K]}

Note that if x is a scoping node of K, records with isSelectorIdentified=True contain the selector-identified nodes for which x is a scoping node. The key constraint dictates that there are no two such records with the same key-sequence. If x is a scoping node of a keyref that refers to K, a reference to a key-sequence ks is only valid if there is a record with this key-sequence in x.KeyInfo[K] (regardless of its isSelectorIdentified value). Thus, the KeyInfo structures are used to verify foreign key references.

Figure 4:
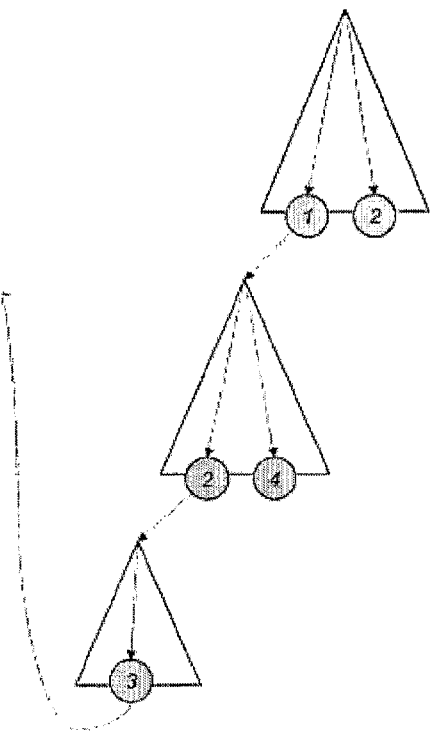
FIG. 4 shows the physical structure of a KeyInfo structure

In order to allow searching for a selector-identified node in the KeyInfo structures, we maintain a search tree over node identifiers for each x.KeyInfo[K] structure. In order to also allow searching for key-sequences, we maintain (for each x.KeyInfo[K] structure) a multi-search-tree over key-sequences. The multi-search-tree is a search tree over the values of the first field in a key-sequence. Each leaf is associated with a search tree over the values of the second field, and so on. So, in a leaf of value v in the first tree, there is a tree that holds information only for key-sequences where the value of the first field is v. A search in this multi-search-tree allows access to the actual records (of x.KeyInfo[K]) that are stored in it. For example, if a node A is a scoping node of K and has three selector-identified nodes B1, B2, B3 whose key-sequences are (1, 2, 3), (1, 4, 5), (2, 3, 4) respectively, then the structure for A.KeyInfo[K] looks as in FIG. 4.

X ChildrenKeyInfo: This is a local data structure, i.e., there are multiple instances of this data structure, associated with document nodes. This data structure exists for each node in the document, though it may be empty for some of the nodes. For a key K and a node x, x. ChildrenKeyInfo[K] contains an entry for every key-sequence ks that appears in the KeyInfo[K] structure of at least one child of x. The entry contains a set of tuples of the form (child, nodeInChild), where child is a child node of x and child.KeyInfo[K] contains a record (nodeInChild, ks, b), b ∈ {True; False}. This information helps in updating the KeyInfo structures when the document is modified. For a key-sequence ks, let x. ChildrenKeyInfo[K][ks] denote the entry with key-sequence ks in x.ChildrenKeyInfo[K]. It is considered null if there is no such entry. We observe the following:
- If a tuple (z, n) appears in x.ChildrenKeyInfo[K][ks] it means that n is a valid candidate to appear in x.KeyInfo[K], i.e., it 'survived' competition from other nodes in the sub-tree of z and appears in z.KeyInfo[K].
- If |x.ChildrenKeyInfo[K][ks]|=1 and x has no selector-identified nodes with key-sequence ks then the 'candidate' that appears in x.ChildrenKeyInfo[K][ks] also appears in x.KeyInfo[K].

x.ChildrenKeyInfo[K] is a multi-search-tree (over key-sequences). For a record (ks, occurrences) in x.ChildrenKeyInfo[K], occurrences is maintained as a hash-table, that maps a child of x to a node in the child's KeyInfo structure.

X.KeyrefInfo: This is a local data structure, i.e., there are multiple instances of this data structure, associated with document nodes. This data structure exists for each node in the document, but x.KeyrefInfo[KR] is NULL if x is not a scoping node of the keyref KR. For a keyref KR and a node x which is a scoping node of KR, x.KeyrefInfo[KR] contains all records of the form (n, ks) where n is a selector-identified node (of KR) in the scope of x and ks is the key-sequence of n. Observe that unlike the case for K, x.KeyrefInfo[KR] is maintained only for scoping nodes of KR and NOT for other nodes. For other nodes, x.KeyrefInfo[KR] is NULL. For each x.KeyrefInfo[KR] structure, we maintain a search tree over node identifiers, and also a multi-search-tree over key-sequences. The entry for a key-sequence ks in the multi-search-tree may contain several records (n$_i$, ks). This is because several selector-identified nodes of the same scoping node of KR may have the same key-sequence.

The document uniquely determines the content of these structures. The incremental algorithms need to ensure this by making the necessary updates to the structures as update operations are performed on the document.

In addition to the aforementioned data structures, for every node x and key K we keep a set of key-sequences x.RemovedSequences[K]. If an algorithm updates x.KeyInfo[K], x.RemovedSequences[K] is the set of key-sequences that appear in x.KeyInfo[K] prior to the update and do not appear there following the update. After updates to the KeyInfo structures are performed, for every node x which is a keyref scoping node we need to verify that there are no nodes that reference the key-sequences in x.RemovedSequences[K]. The RemovedSequences sets are only used during the execution of certain update algorithms and are initialized to be empty when such an algorithm is executed.

Figure 5:
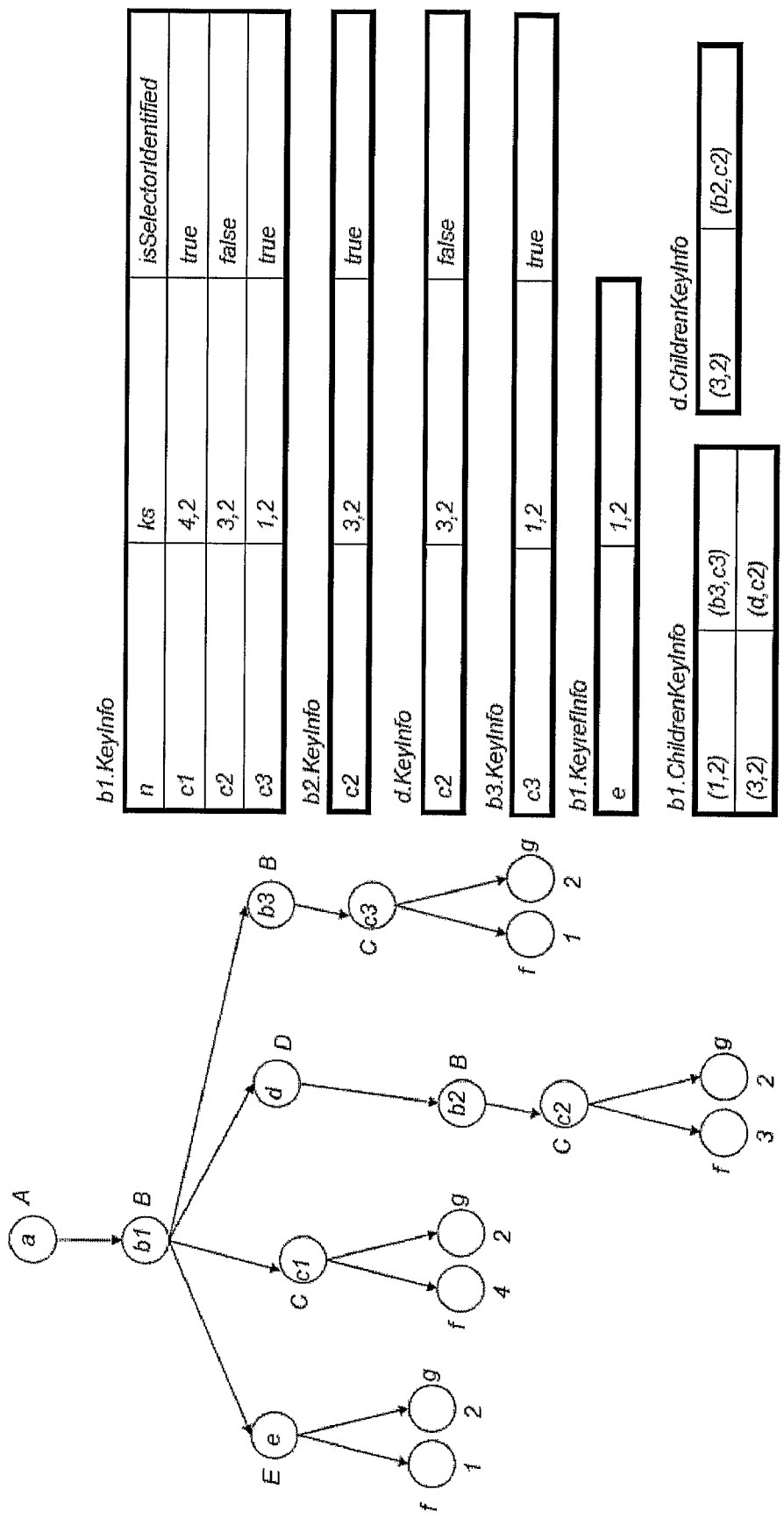
FIG. 5 is an example of data structures.

FIG. 5 shows a portion of the data structures for the document depicted in FIG. 3 (and repeated in FIG. 5). Note that the KeyInfo structures that are not shown contain no records.

Note: We use a succinct representation of strings as integers based on a TRIE structure. Let N be the number of text nodes in the document. We map each string value of a text node in the document to an integer in the range 1 . . . N. In the tree structure that represents the document, for each text node we save both the string value and the integer. We also save the mapping (from strings to integers) in a TRIE structure. This is a tree in which every node represents a string prefix, and has outgoing edges for all possible 'next character' of some string (that exists in the document). We keep the integer values in the nodes that represent the corresponding string values. We maintain an array MapInfo[1 . . . N]. MapInfo[i] is the number of text nodes whose value is mapped to i. Suppose we update the value of some text node tn whose string value is $str_1$ and whose integer value is i. Let the new string value be $str_2$. We decrease MapInfo[i] by 1. We look for str2 in the TRIE structure. If it is there, associated with an integer j, then we increment MapInfo[j] by 1 and associate j with the text node. If $str_2$ is not in the TRIE, we associate it with k, where k is the lowest integer such that MapInfo[k]=0. We increase MapInfo[k] by 1, insert this mapping to the TRIE and associate the string value $str_2$ and the integer value k with the text node tn.

Using this representation, the time to compare two key-sequences is (number of fields)*(time to compare integers)= O(|S|)*O(log|N|)=O(|S|log|D|), where N is the number of text nodes in the document, which is no more than the size of the document. For practical purposes, we assume that comparing two integers is done in O(1), and then the time to compare key-sequences is O(|S|). We use |S| here as an upper bound on the number of fields in a key-sequence.

2.3.3 Populating the Data Structures

KeySN and KeyrefSN: We obtain the scoping nodes of each key and keyref constraint. This is done as follows, we use an algorithm that is similar to a validation algorithm presented in [6]. Given a schema S, we construct finite deterministic automata that represent the structural constraints imposed by the schema, and use these automata to locate the scoping nodes through a traversal of the document. The algorithm populates KeySN[K] (respectively, KeyrefSN[KR]) for each key (respectively, keyref) constraint K defined in S. Given a schema S, we assign unique names to all anonymous complex types that appear in the schema. Then, for each complex type T we construct a regular expression $R_T$ that represents the structure of T. The symbols of $R_T$ are the elements (tags) that appear in T. We ignore attributes, since we assume the documents on which we evaluate queries are valid (so there is no need to go over the attributes. Also, attributes clearly cannot be scoping nodes). For each regular expression $R_T$ we construct a Glushkov automaton $A_{R_T}$ (see 2.2.1 in [6]). Aside from the initial state, the states of $A_{R_T}$ are positions in $R_T$. Each such position corresponds to an element e that appears in T (e being the element's tag). With every state we associate the type T of the corresponding element and also the key constraints $\{K_i\}$ and keyref constraints $\{KR_i\}$ that are defined in the element. Note that there may be several elements with the same tag e and different types, defined in different complex types. We consider all simple types as type $T_{simple}$. After constructing the automata, we create a mapping of every global (i.e., top level) element e of type T to the automaton $A_{R_T}$ that corresponds to the type T. We also save sets of the keys and keyrefs defined in the element. Note that there are no two global elements with the same name. Therefore we can simply save a mapping of element names (tags) to automata (and to lists of keys and keyrefs). Our algorithm is based on the validation algorithm presented in section 3.1 of [6]. The algorithm performs a depth-first traversal of the document tree. At each stage it keeps an automaton for every "open" element (i.e., an element whose sub-tree has not yet been fully traversed). The current states of the running automata are saved in a stack. Upon encountering the root node r (that is, the topmost user defined element in the document), we start running the corresponding automaton (which we find according to the element name). As this automaton encounters the first child (i.e., sub-element) of r, it moves from its initial state to a new state q. Recall that when constructing the automaton, we associated with q a type T. If T is not $T_{simple}$, we start running the corresponding automaton $A_{R_T}$. We continue traversing the tree. After we finish running an automaton for some node (i.e., traverse the node's sub-tree), we make a transition in the automaton of the parent node. We populate the data structures as we go along. For the root node r (that is, the topmost user defined element), we have a set of keys $S_K$ and a set of keyrefs $S_{KR}$ that we access according to the tag of r (recall that we save these sets after creating the automata). For every key k ∈ SK, we add the root node to KeySN[k], with value 0 (i.e., KeySN[k][r]=0. For a node n, KeySN[k][n] is the distance of n from the root.). For every keyref kr ∈ $S_{KR}$, we add the root node to KeyrefSN[kr]. When, during the traversal of the document, we reach a non-root node n, this is done in a transition to some state q (possibly a transition from q to q) of the automaton run at n's parent node. Let $S_{K_q}$ and $S_{KR_q}$ be the sets of keys and keyrefs, respectively, associated with q. Then, for every key k∈ $S_{K_q}$, we add n to KeySN[k]. For every keyref kr ∈ $S_{KR_q}$, we add n to KeyrefSN[kr]. The value for n's entry is i's distance from the root (we keep track of this information as we traverse the document). In creating regular expressions to represent complex types, we handle various features of XML Schema:

Sequences are represented as concatenations in the regular expression. For example a sequence of an element $e_1$ with minOccurs=0, maxOccurs=unbounded, and of an element $e_2$ with minOccurs=1, maxOccurs=2, is represented as $e^*_1 e_2(\epsilon+e_2)$. If the aforementioned sequence appears with maxOccurs=unbounded then the regular expression would be $(e^*_1 e_2 (\epsilon+e2))^*$.

A choice in the schema is represented using '+' in the regular expression.

If an xs:all appears in the schema, we need to write all possibilities in the regular expression. For example an xs:all between elements $e_1$, $e_2$ and $e_3$ is translated into the expression $e_1e_2e_3+e1e3e2+e_2e_1e_3+e_2e_3e_1+e_3e_1e_2+e_3e_2e_1$.

If a type contains a reference to a model group then we write the content explicitly and then generate the regular expression.

If a type contains an <xs:element ref="e"/>, for some global element e, e appears in the regular expression and e's type is associated with the corresponding state of the automaton.

Substitution groups: Suppose some (global) element $e_1$ is the head of a substitution group whose members are the (global) elements $e_2, \ldots, e_k$. Whenever a 'ref' to e1 appears in some type, instead of using e1 in the corresponding regular expression, we use (e1+e2+ . . . +$e_k$).

If a type T' derives from a type T, in order to construct the regular expression $R_{T'}$ we write the content of T' explicitly and then translate it into a regular expression.

If an element e appears in the document with an xsi:type specification, xsi:type=T, we use the automaton $A_{R_T}$, instead of the automaton to be used according to the description of the algorithm above. Note that xsi:type is the only mechanism through which an element appears in the document with a different type than the type specified in the schema (specifically, with a type derived from the one specified in the schema).

If a type contains an xs:any element, it means that any well formed XML element may appear. Let $l_1, \ldots, l_n$ be the tags of elements that appear in the schema. Then xs:any is represented in the regular expression by $(l_1+ \ldots +l_n+\gamma)$, where γ represents an 'unknown' symbol. With the state that corresponds to the γ symbol in the corresponding automaton, we associate the type $T_{any}$ and a NULL automaton. At run time, if we get to this state then we do not go down the current branch, since anything may appear there. In a preprocessing stage, we replace any tag of the document that does not appear in the schema with γ.

Now we discuss the time complexity of the algorithm. The construction of a Glushkov automaton is quadratic in the size of the regular expression. Therefore the first stage of our algorithm, in which we translate a schema into automata, can be done in time $O(|S|^4)$. According to [6], running the algorithm for a document D takes time O(|D|log|S|). Note that the algorithm presented in [6] handles Document Type Definition (DTD) and a basic subset of XML Schema, while we handle also more advanced features of XML Schema. However, our algorithm's execution is very similar. Also, the scoping nodes need to be inserted into KeySN and KeyrefSN. Each insertion takes time O(log|D|), and there are O(|D|) insertions for each key/keyref constraint (O(|S||D|) for all constraints). Therefore the complexity of obtaining the scoping nodes is $O(|S|^4)+O(|D|log|S|)+O(|S||D|log|D|)$. For a fixed schema, the complexity is O(|D|log|D|).

KeySelIdent: For a key K with a selector expression Sel, we create an automaton that represents $Sel^{-1}$. We run it in a bottom up traversal of the document tree. That is, an instance of the automaton is created for every leaf of the tree, and it climbs along the path to the root. In each state, we store the nodes that we encountered so far which are currently in this state. In each node we wait for the automata from all children to arrive before continuing up, so that we go over each node only once. When we reach a scoping node, we know that each node stored in an accepting state is a selector-identified node of this scoping node. When discovering that a node n is a selector-identified node of a node s, we add the record (n, [], {s}) (the key-sequence will be calculated later) to KeySelIdent[K], or, if a record (n, [ ]; SN) already exists, we add s to SN. In order to calculate the key-sequences, for each field expression f we create an automaton that represents the reverse expression $f^{-1}$. We run it in a bottom up traversal. When we reach a selector-identified node, we know that nodes in accepting states are its fields (in a valid document, there should be only one such field for a selector-identified node, and it should be a simple-type node). We add the field value to the key-sequence in KeySelIdent.

Complexity:

When running the $Sel^{-1}$ automaton, we go over each node once. For each node, we check if it is a scoping node (by searching in KeySN). This takes time O(|D|log|D|).

For each selector-identified node n, we access KeySelIdent for each scoping node of n (this is because when we reach each of these scoping nodes, n is in an accepting state, and we need to either add a record to KeySelIdent or modify an existing record). A selector-identified node whose depth (i.e., distance from the root) is x can have at most x scoping nodes. The worst case complexity is if the height of the document tree is h=O(|D|). Then, if there are O(|D|) selector-identified nodes and each one has O(|D|) scoping nodes (its ancestors), we get O(|D|²) accesses to KeySelIdent, and O(|D|²log|D|) complexity (O(|S||D|²log|D|)) for all keys in the schema. On the other hand, if we assume that the tree has a branching factor of b and height O(log$_b$|D|) then the complexity is O(log|D|*$\Sigma_{x=1}^{h}$ b$^{x}$* x), which is smaller than $$O\left(\log|D| * h * \sum_{x=1}^{h} b^x\right).$$

Since $$\sum_{x=1}^{\log_b|D|} b^x = O(|D|),$$

we get O(|D|log²|D|) (O(|S||D|log²|D|)) for all keys in the schema). From here on, we'll use the term average case to denote the case where the tree has a branching factor of b and height O(log$_b$|D|).

Since there are O(|D|) selector-identified nodes, and each one has O(|S|) fields, calculating the key-sequences and saving them in KeySelIdent takes time O(|S||D|log|D|) (O(|S|²|D|log|D|)) for all keys in the schema). This is the time it takes to run the f$^{-1}$ automata (for each field expression f ), and accessing the KeySelIdent data structures for each (selector-identified node, field node) pair (that is, O(|S||D|) times).

The complexity of populating the KeySelIdent structure, for all keys in the schema, is O(|S||D|²log|D|+|S|²|D|log|D|j) in the worst case, and O(|S||D|log²|D|+|S|²|D|log|D|) in the average case.

KeyInfo: We populate these structures in two stages.
1. First, each selector-identified node of the key needs to be inserted into the KeyInfo structure of each of its scoping nodes (this is done based on the KeySelIdent structure).
2. Then, in order to create the KeyInfo structures, we need to traverse the document tree bottom-up and, for each node, create the union of its children's KeyInfo structures (and if the node is a scoping node, also the records for its selector-identified nodes), while removing duplicate key-sequences (that were added from the children's structures). For a node v, v.KeyInfo[K] is calculated as follows. We insert the records from all children structures of v into a temporary search tree, tmpKeyInfo, which is ordered by key-sequences (has the same structure as v.KeyInfo[K]). If we try to add a record with a key-sequence that already appears in tmpKeyInfo, this means that the key-sequence appears in more than one child structure. Thus, we save this key-sequence in a separate hash-table duplicateKeySequences, and we do not insert the record. Then, we insert the records from tmpKeyInfo into v.KeyInfo[K]. However, we disregard the records whose key-sequence appears in duplicateKeySequences. Also, if the key-sequence of a record already appears in v.KeyInfo[K] (due to a selector-identified node of v), we do not add the record.

Complexity:
First stage (inserting each selector-identified node into the KeyInfo structures if its scoping nodes): each insertion takes time O(|S|log|D|) (since KeyInfo is a multi-search-tree). A selector-identified node has at most O(h) scoping nodes, and thus the number of insertions is at most O(h|D|). Thus, the complexity of this stage (for a single key constraint) is O(|S|h|D|log|D|).

Seconds stage: For a node v, let the total number of records in v's children structures be N(v).
The time it takes to create tmpKeyInfo for v is O(|S|*N(v)*log N(v)), since we insert N(v) records into the multi-search-tree tmpKeyInfo.
For all nodes in the document, we get $$O\left(\sum_{v \in D} |S| * N(v) * \log N(v)\right) = O\left(|S|\log|D| * \sum_{v \in D} N(v)\right).$$

Since each node has at most O(h) ancestors, $$\sum_{v \in D} N(v)$$

is at most O(h*|D|), and thus we get O(|S|h|D|log|D|).
To this complexity, we need to add the complexity of making the insertions of records (from the tmpKeyInfo structures) into the KeyInfo structures. Each selector-identified node is inserted into at most h KeyInfo structures, and each insertion takes time O(|S|log|D|), since there are at most O(|D|) records in a KeyInfo structure (a node may appear only once in a single KeyInfo structure). Thus, the complexity of insertions is O(|S|h|D|log|D|).
Therefore, the complexity of populating the KeyInfo structures of a key is O(|S|h|D|log|D|), which is O(|S||D|²log|D|) in the worst case, or O(|S||D|log²|D|) in the average case. For all keys in the schema, the complexity is O(|S|²|D|²log|D|) (or O(|S|²|D|log²|D|)).

KeyrefSelIdent and KeyrefInfo: This is similar to creating the KeySelIdent and KeyInfo structures. The difference is that the union operations are not needed. The complexity is still O(|S|²|D|²log|D|)/O(|S|²|D|log²|D|).

ChildrenKeyInfo: As we go over the KeyInfo[K] structures of the children of a node n (in order to populate n.KeyInfo[K]), we also insert tuples into n.ChildrenKeyInfo[K]. Each selector-identified node may appear in the ChildrenKeyInfo[K] structures of its ancestors. As calculated above, this amounts to O(|D|²) insertions in the worst case, or O(|D|log|D|) insertions on average. The complexity for a key K is O(|S||D|²log|D|)/O(|S||D|log²|D|).

KeyFieldInfo: As we calculate the key-sequence of a selector-identified node s (when we create the KeySelIdent[K] structure), if the i'th field expression evaluates to a node f then we add the record (f , {(s,i)}) to KeyFieldInfo[K], or add (s, i) to the occurrences of f if f already appears in KeyFieldInfo[K]. There are O(|D|) field nodes, and each one may be a field of its ancestors. Therefore (similarly to the above calculations), we access KeyFieldInfo[K] O(|D|²) times in the worst case, or $O(|D|\log|D|)$ times on average, which takes time $O(|D|^2\log|D|)/O(|D|\log^2|D|)$. For all keys in the schema, the complexity is $O(|S||D|^2\log|D|)$.

KeyrefFieldInfo: is similar to KeyFieldInfo.

The complexity of populating the data structures is $O(|S|^4+|S|^2|D|^2\log|D|)$ in the worst case, or $O(|S|^4+|S|^2|D|\log^2|D|)$ on average. For a fixed schema, we get $O(|D|^2\log|D|)$ or $O(|D|\log^2|D|)$.

2.4 Non-incremental Validation Following, we disclose an algorithm for validating key and keyref constraints from scratch, and analyze its complexity (which is an upper bound on the complexity of this problem). Given a document D that conforms to a schema S, we create the KeySN, KeyrefSN, KeySelIdent, KeyrefSelIdent, KeyInfo and KeyrefInfo structures. As we create the KeyInfo structures, we make sure that each field expression evaluates to a single, simple-type node, and that there are no duplicate key-sequences in the same scoping node of a key (otherwise, the creation of these structures will fail). Creating the structures takes time $O(|S|^4+|S|^2|D|^2\log|D|)$ in the worst case, $O(|S|^4+|S|^2D|\log^2|D|)$ on average (as explained in Section 2.3.3). For a keyref KR and a scoping node n of KR, as we create n.KeyrefInfo[KR], we search for every key-sequence of n.KeyrefInfo[KR] in n.KeyInfo[K], where K is the key that KR refers to. Each such search takes time $O(|S|\log|D|)$. As explained in Section 2.3.3, the total number of occurrences of selector-identified nodes in scoping nodes is $O(|D|^2)$ in the worst case, $O(|D|\log|D|)$ on average. Since there are $O(|S|)$ keyref constraints, the complexity of performing these searches is $O(|S|^2|D|^2\log|D|)$ in the worst case, $O(|S|^2|D|\log|D|)$ on average.

Therefore, the complexity of validation is $O(|S|^4+|S|^2|D|^2\log|D|)$ in the worst case, $O(|S|^4+|S|^2|D|\log^2|D|)$ on average), or $O(|D|^2\log|D|)$ ($O(|D|\log^2|D|)$ on average) for a fixed schema. This complexity may seem high, but it stems from the 15 complex semantics of foreign key references in XML Schema. Simpler constraints can be checked more efficiently. For example, in [5], a keyref constraint is defined by $C(B.l_B \subseteq A.l_A)$, where A, B, C are elements defined in a DTD, $l_A$ is a child element of A and $l_B$ is a child element of B. The semantics of the constraint is that for each subtree rooted at a C node, for each B node b there is an A node $\alpha$ such that $b.l_B = \alpha.:l_A$. Such a constraint can be easily checked by collecting the $l_B$ and $l_A$ values during a bottom-up sweep of the document. At every C node, the constraint is checked by making sure that every value in the set of $l_B$ values appears in the set of $l_A$ values. Checking the validity of a document with respect to an XML Schema keyref constraint is much more complicated.

2.5 Space Complexity

The non-incremental validation algorithm described above, as well as the incremental validation algorithms, use the data structures described in Section 2.3. The sizes of these data structures, for a document D that conforms to a schema S, are as follows.

KeySN: For each key constraint, KeySN contains an entry for each scoping node. Thus its size is $O(|S||D|)$.

KeyrefSN: Same as KeySN—$O(|S||D|)$.

KeySelIdent: Contains an entry for each selector-identified node. Since the entry contains a list of scoping nodes, its size is $O(h)$. Thus, the size of this data structure (for all key constraints) is $O(|S||D|h)$.

KeyrefSelIdent: Same as KeySelIdent–$O(|S||D|h)$.

KeyFieldInfo: Contains an entry for each node that serves as a field of another node. The entry contains the occurrences of the field (at most $O(h)$ occurrences). Thus, the size of this data structure (for all key constraints) is $O(|S||D|h)$.

KeyrefFieldInfo: Same as KeyFieldInfo—$O(|S||D|h)$.

KeyInfo: Each selector-identified node may have an entry in the KeyInfo structure of each of its ancestors. Thus the size of these structures is $O(|S||D|h)$.

KeyrefInfo: Each selector-identified node has an entry in the KeyInfo structure of each of its scoping nodes (at most $O(h)$ scoping nodes). Thus the size of these structures is $O(|S||D|h)$.

ChildrenKeyInfo: For each record of the KeyInfo structure of a node n, there is a corresponding record in the ChildrenKeyInfo structure of n's parent. Thus, the size of the ChildrenKeyInfo structures is $O(|S||D|h)$.

If we consider the size of a key-sequence as $O(S)$, then the size of the KeyInfo structures is $O(|S|^2|D|h)$. This is also the total size of the data structures. In the worst case, this amounts to $O(|S|^2|D|^2)$. Note however, that the worst case is very uncommon. In the case where $h=O(\log|D|)$, the size of the data structures is $O(|S|^2|D|\log|D|)$. It is also important to note that in most real cases, a field node has only a single selector-identified node, a selector-identified node has only a single scoping node, and a scoping node cannot be a descendant of another scoping node. This greatly reduces the size of the data structures.

2.6 Validation of Algorithms

Each algorithm performs an operation that changes the document. Changes are rolled back if performing the operation creates an invalid document. Validity is checked incrementally, i.e., without validating the changed document in its entirety. For simplicity, we assume one key constraint K and one keyref constraint KR. Therefore, we refer to the data structures without explicitly indicating a key or keyref constraint (i.e., we use x.KeyInfo to refer to x.KeyInfo[K]). Our algorithms can be easily extended to handle multiple key and keyref constraints.

2.6.1 Changing the Value of a Simple-Type Node

We define an update operation update(f, newval) where f is some simple-type node and newval is the value to be assigned to it. We assume that newval is different that the current value of f, otherwise the change has no effect.

The idea behind the algorithm: Since selector expressions do not include predicates, changing the value of a simple-type node can only change the key-sequences of existing selector-identified nodes (and cannot change the sets of selector-identified nodes). These nodes can be found via lookup in the KeyFieldInfo and KeyrefFieldInfo structures. Since the selector and field expressions are restricted XPath expressions, we know that the affected selector-identified nodes, and their scoping nodes, are all on the path from the root to the changed simple-type node. Thus, we need to traverse this path, bottom-up, and update the data structures (KeyInfo, ChildrenKeyInfo and KeyrefInfo) associated with the nodes along the path. The result of updating the KeyInfo structure of a node x serves as input for updating the ChildrenKeyInfo structure (and subsequently the KeyInfo structure) of its parent y. For every key scoping node along the path, we check that the key is not violated. That is, if s is a key scoping node, n is a selector-identified node of s, and the key-sequence of n changes from ks to ks', we check that the key-sequence ks' does not already appear in s.KeyInfo. For every keyref scoping node along the path, we check that the keyref is not violated. That is, if s is a keyref scoping node, for every key-sequence in s.KeyrefInfo that changes we check that the new key-sequence appears in s.KeyInfo, and for every key-sequence that is removed from s.KeyInfo we check that it is not referenced in s.KeyrefInfo.

The Algorithm

Input: A schema S, a document D (represented in memory), a node f and a value newval.

Output: A result—VALID or INVALID.

Pre-conditions: D is valid with respect to S. f is a simple-type node in D. The data structures corresponding to D (as described in Section 2.3) have been created, and are correct (i.e., reflect the state of D).

Post-conditions: The data structures are correct. If the result is INVALID then the document is unchanged (identical to the input document). If the result is VALID, the value of f is newval and the document is otherwise unchanged.

In order to simplify the description of the algorithm, we assume that when the algorithm determines that the update is invalid, it performs a rollback of all changes to the data structures, and exits with output INVALID. We indicate this by writing exit(INVALID) in the pseudo-code. The algorithm is depicted in FIG. 6. It consists of two stages. In the first stage we find which selector-identified nodes of K and KR are affected by the update. In the second stage we traverse the path from the changed node to the root, and update the data structures of each node. Since selector expressions do not include predicates, changing the value of a simple-type node cannot change the sets of selector-identified nodes (it only changes the key-sequences of the selector-identified nodes).

1. Finding affected selector-identified nodes. We search for f in KeyFieldInfo and KeyrefFieldInfo, to determine which selector-identified nodes are affected by the update, i.e., nodes for which f is a field. We also update the key-sequences stored in the relevant records of KeySelIdent and KeyrefSelIdent. Following these searches we have a set of key-sequence updates of the form (node, old key-sequence, new key-sequence) for K and for KR. We call these KUpdates and KRUpdates. A node may appear only once in KUpdates (respectively, KRUpdates). All the nodes that appear in KUpdates (respectively, KRUpdates) are on the same path from the root to f, since they are all ancestors of f.

2. Updating the data structures of nodes along the path to the root. This stage is executed in the UpdateNodes(KUpdates; KRUpdates; f) function, depicted in FIG. 7. This function, which is the heart of the algorithm, uses the functions UpdateNode$_K$ and UpdateNode$_{KR}$, which we now describe, in order to update the data structures associated with a single node.

UpdateNodeK(y, x, changesInChild, KUpdates)

This function updates y.KeyInfo and y.ChildrenKeyInfo, and also inserts the appropriate key-sequences into y.RemovedSequences. These updates are done based on the set of key-sequence changes KUpdates and on the changes made to the KeyInfo structure of y's child node x. These changes are passed in the set changesInChild. These are tuples of the form (ks, n), where ks is a key-sequence whose record in x.KeyInfo has changed and n is the node that appears in the new record for ks in x.KeyInfo (if there is one). I.e., if $r_1$ is the record for ks in x.KeyInfo before UpdateNodeK(x, . . . ) is executed (possibly $r_1$=null), and $r_2$ is the record for ks in x.KeyInfo after UpdateNode$_K$(x, . . . ) is executed (possibly $r_2$=null), then $r_1 \neq r_2$. If there is no such new record (i.e., a record has been removed), n is null. A key-sequence may only appear once in changesInChild. The function UpdateNodeK returns the set of the changes it has made (in the same format as changesInChild), which is later used for updating the parent of y. We denote this set by changes. It is initialized to Ø and is returned as the result at the end of the function execution. Since a key-sequence ks can only appear once in changes, we use the syntax changes[ks]:=n to denote the addition of the tuple (ks, n) to changes. This means that if a tuple (ks, n') already exists in changes, it is replaced by (ks, n). The function is depicted in FIG. 8. It uses the functions ProcessChanges, HandleOldKeySequences and HandleNewKeySequences, depicted in FIGS. 10, 11 and 12, respectively.

For example, suppose that the value of c3.f in the document of FIG. 3 is changed from 1 to 5. In this case, c3 is the only affected selector-identified node. KUpdates={(c3, (1, 2), (5, 2)}. b3.KeyInfo is updated with the new key-sequence of c3. This change is passed on to the execution of UpdateNode$_K$ on b1, i.e., changesInChild={((1, 2), null), ((5, 2), c3)}. As changesInChild is processed, b1. ChildrenKeyInfo is updated. The record (c3,(5,2),False) is added to b1.KeyInfo. The record (c3, (1, 2), True) is not yet removed from b1.KeyInfo (since it appears with True). Then, KUpdates is processed. Since c3 is a selector-identified node of b1, (c3, (1, 2), (5, 2)) ∈ RelevantUpdates. First we process the 'old' key-sequence (1, 2), thus the record (c3, (1, 2), True) is removed. Then we process the 'new' key-sequence (5, 2), thus the record (c3, (5, 2), False) is removed and the record (c3, (5, 2), True) is added to b1.KeyInfo.

UpdateNodeKR(y, KRUpdates)

This function updates the KeyrefInfo structure of a node according to the received key-sequence changes (KR Updates) and also checks whether all references are valid. It is depicted in FIG. 9.

Complexity

We consider the complexity of:

Finding affected nodes. We access the KeyFieldInfo and KeyrefFieldInfo data structures according to the node id of f. Since these are search trees over O(|D|) node identifiers, this takes time O(log|D|).

Executing UpdateNodes. We execute UpdateNode$_K$ and UpdateNode$_{KR}$ O(h) times (where h is the height of the document tree), once for each node on the path from f to the root. In an execution of UpdateNode$_K$, we may need to perform O(h) searches for key-sequences in a KeyInfo structure (because at most O(h) key-sequences are changed due to the update—these are key-sequences of ancestors of f), and each search takes time O(|S|log|D|) (searching within O(|S|) levels of nested search trees). There are also O(h) searches for node identifiers, each of which takes time O(log|D|)). Thus the complexity of executing UpdateNode$_K$ is O(|S|*h*log|D|). This is also the complexity of UpdateNode$_{KR}$ (since we search for nodes and key-sequences in the KeyrefInfo structures). Thus the complexity of UpdateNodes is O(|S|*h$^2$*log|D|).

Therefore, the complexity of the algorithm is O(|S|h$^2$log|D|), or O(h$^2$log|D|) for a fixed schema. On average, h=log|D| and we get O(|S|log$^3$|D|). In the worst case, h=O(|D|) and the complexity is O(|S||D|$^2$log|D|). Note that in most real-world cases, a simple-type node serves as a field of only one selector-identified node, and then the complexity is only O(|S|h log|Dj). Also note that since our data structures use search trees, searching within them takes logarithmic time. Using hash tables, the log|D| factors may be replaced by expected O(1) time.

2.6.2 Transactions: Changing the values of a set of simple-type nodes

We define an update operation update(($f_1$, newval$_1$), . . . , ($f_m$, newval$_m$)) where for 0≤i≤m, $f_i$ is some simple-type node and newval$_i$ is the value to be assigned to it. Note that simply doing these updates in order by using the algorithm of Section 2.6.1 is wrong, as an INVALID update may be 'corrected' by a later one (that is, performing only the first update leaves the document in a temporary invalid state). As we present the algorithm, we demonstrate it on the document depicted in FIG. 3. Recall the definitions of key and keyref constraints for this document, presented in Section 2.2. The scoping nodes of the key are the B nodes. The selector of the key is ./C|. /B/C and the gields are ./f and ./g. The scoping nodes of the keyref are the B nodes. The selector of the keyref is ./E and the fields are ./f and ./g. The relevant KeyInfo, ChildrenKeyInfo and KeyrefInfo structures are depicted in FIG. 5. We perform the following update: (e.f,6), (c1.f,6), (c2.f,5), (c3.f,5).

The idea behind the algorithm: As in the case of a single change, we can find the afected selector-identified nodes according to the KeyFieldInfo and KeyrefFieldInfo structures. The difference is that we have to consider all value changes when we calculate the new key-sequence for an affected selector-identified node. From every changed node, we begin to move up the tree and update the structures associated with nodes. As we progress along the path from a changed node $f_{i_1}$ to the root, we can update the structures as in the single-change case, as long as we don't reach a node x which is also an ancestor of some other changed node $f_{i_2}$. We call such a node a join node. In order to update its structures, we need to first calculate the changes along the path to x from each $f_i$, i=1 ... m, such that the changed node $f_i$ is a descendant of x. Thus, we update the data structures in a layered manner.

First, we update the nodes that have only one $f_i$ descendant. Then we move up the tree and update nodes with two descendant $f_i$'s (these are join nodes of rank 2). From these nodes we continue up the tree, until we reach join nodes of rank 3 or higher, and so forth. Along the path from a join node of rank r to a join node of a higher rank (r+1 or more), data structures are updated similarly to the way they are updated in the single-change case. Only when we reach a join node of rank r+1 or higher, do we have to use a slightly different method of updating data structures, in order to integrate changes from several paths.

The Algorithm

Input: A schema S, a document D (represented in memory), tuples ($f_1$, $newval_1$), . . . , ($f_m$, $newval_m$), m>1, where for $0 \leq i \leq m$, $f_i$ is a node and $newval_i$ is the value to be assigned to it.

Output: A result—VALID or INVALID.

Pre-conditions: D is valid with respect to S. For $1 \leq i \leq m$, $f_i$ is a simple-type node in D. The data structures corresponding to D (as described in Section 2.3) have been created, and are correct (i.e., reflect the state of D).

Post-conditions: The data structures are correct. If the result is INVALID then the document is unchanged (identical to the input document). If the result is VALID, the value of $f_i$ is $newval_i$ for each $1 \leq i \leq m$, and the document is otherwise unchanged.

1. Finding affected nodes. For each $1 \leq i \leq m$, we search for $f_i$ in KeyFieldInfo and KeyrefFieldInfo, to determine which selector-identified nodes are affected by the change in the value of $f_i$, i.e., nodes for which $f_i$ is a field. Note that changing values of nodes does not change which nodes are selector-identified nodes. We also update the key-sequences stored in the relevant records of KeySelIdent and KeyrefSelIdent. We update the key-sequences according to all changes that affect them. Note that a key-sequence may contain several fields whose values are changed. After these searches, we have a set of key-sequence updates for K (respectively, KR), denoted by KUpdates (respectively, KRUpdates), of the form (node, old key-sequence, new key-sequence). A node may appear only once in KUpdates (respectively, KRUpdates). In our running example, we perform the update (e.f6), (c1.f,6), (c2.f,5), (c3.f,5). Therefore, KRUpdates={(e, (1; 2), (6, 2))}; KUpdates={(c1, (4, 2), (6, 2)), (c2, (3, 2), (5, 2)), (c3, (1, 2), (5, 2))}.

Let $KUpdates_i$ (resp., $KRUpdates_i$) be the set of key-sequence updates (n, ks, ks') ∈ KUpdates (resp., KRUpdates) such that $f_i$ is a field of n.

2. Finding Join Nodes. A node n is a Join Node if it is on the paths of at least two $f_i$ nodes to the root. In other words, the KeyInfo structure of n may need to be updated according to changes of at least two fields. Denote the set of Join Nodes by JN. We find these nodes as follows. With each node v on the path from some $f_i$ to the root, we associate an integer counter [v], initially 0 (counter can be implemented as a hash-table, keyed by node objects). For each $1 \leq I \leq m$, for each node v on the path from $f_i$ to the root (including $f_i$ and the root), we increment counter[v] by 1. JN contains all nodes n such that counter[n]≧2. If n ∈ JN and counter[n]=k, we say that the rank of n is k, denoted rank(n)=k. Next, if $n_1$ ∈ JN, $n_2$ ∈ JN, rank($n_1$)=rank($n_2$) and $n_1$ is an ancestor of $n_2$, then we remove $n_1$ from JN. This ensures that once we reach a node n ∈ JN, the next Join Node on the path to the root has a higher rank.

Figure 13:
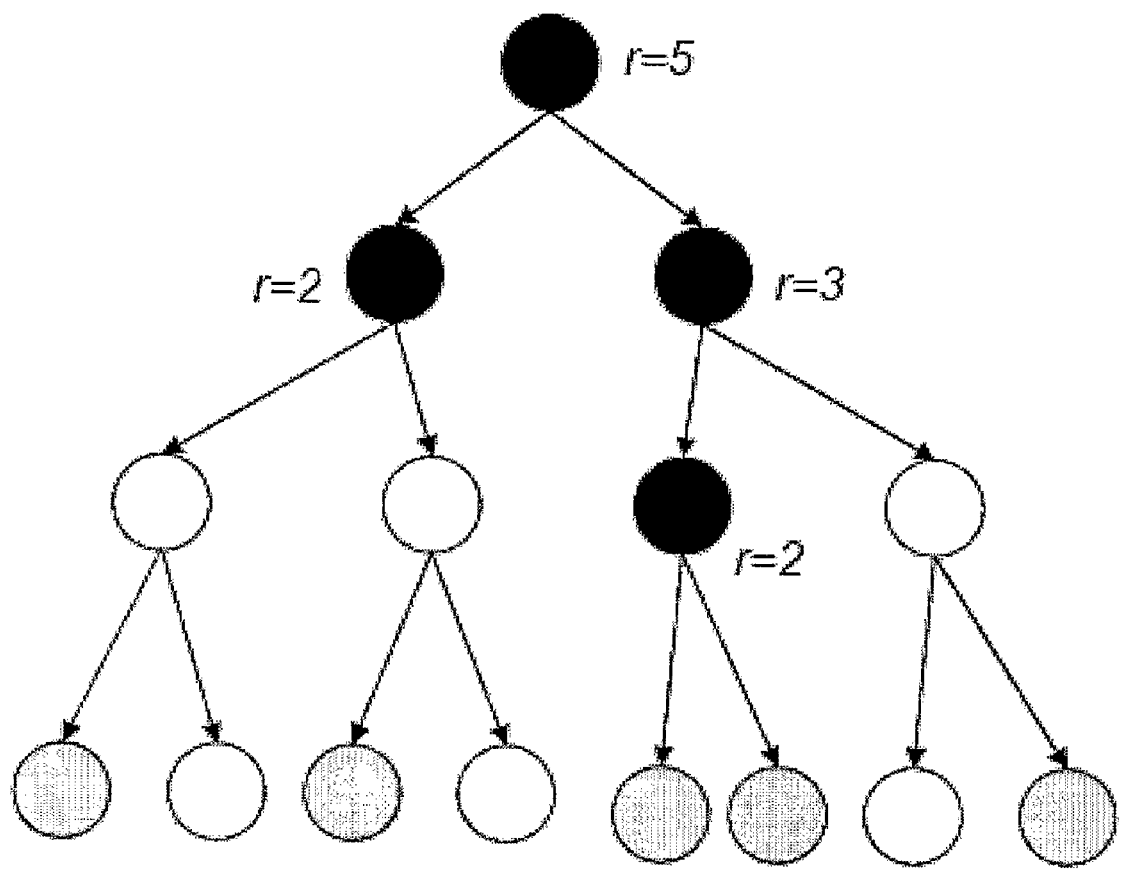
FIG. 13 illustrates an example of Join Nodes—a node on the paths of at least two fi nodes to the root.

In the running example, JN={b1} and rank(b1)=4. FIG. 13 shows another example, with a larger set of Join Nodes. In it, the $f_i$ nodes appear in grey and the Join Nodes appear in black. The rank of each Join Node is next to it.

3. Updating nodes: First stage. In this stage, for each i, we update the KeyInfo and KeyrefInfo structures of nodes on the path from $f_i$ to the root. However, we do not climb all the way to the root, only up to the first Join Node that we encounter, as a Join Node needs to receive updates from two or more field changes. This stage is executed in the function BeforeJN, depicted in FIG. 14. This function uses the functions UpdateNodeK and UpdateNodeKR, described in section 2.6.1. Note that within this stage we update nodes that are on the path of only one $f_i$ to the root. Therefore, when we update such a node we know that it will not be updated later due to changes of other $f_i$'s. Thus, invalid references found in this stage indicate an invalid update operation (exit(INVALID) in the code of UpdateNodeKR). Also note that for each i, if $n_i$ is the last node that we update on the path from some $f_i$ to the root, then we save the changes made to $n_i$.KeyInfo in $n_i$.changes (bold line, FIG. 14). This is used when, in the next stage of the algorithm, we update the Join Node that we have reached.

In this stage of our running example, we update nodes along the path from each changed field to b1 (which is the only Join Node). Since the only node with a non-empty KeyrefInfo structure is b1, no changes are made to KeyrefInfo structures in the $UpdateNode_{KR}$ calls of this stage. We now describe how the KeyInfo and ChildrenKeyInfo structures are updated. On the path starting at e.f, we update only e. Since e is not a scoping node, e.KeyInfo and e.KeyrefInfo remain empty. The same holds for c1, on the path starting at c1.f.

On the path starting at c2.f, c2's structures are not changed. When we execute $UpdateNode_K$(b2, . . . ), RelevantUpdates= (c2, (3, 2), (5, 2)) and therefore we remove the record (c2, (3, 2), True)) from b2.KeyInfo and add the record (c2, (5, 2), True)). Then $UpdateNode_K$(d, b2, . . . ) is executed, with changesInChild={((3, 2), null), ((5, 2), c2),}. Since d is not a scoping node, RelevantUpdates is empty and so we only need to process changesInChild. We remove the tuple (b2, c2) from d.ChildrenKeyInfo[(3, 2)] and remove the record (c2, (3, 2), False)) from d.KeyInfo. We add the tuple (b2, c2) to d.ChildrenKeyInfo[(5, 2)] and add the record (c2, (5, 2), False)) to d.KeyInfo. We set d.changes to {((3, 2), null), ((5; 2), c2)}.

On the path starting at c3.f, c3's structures are not changed. When we execute $UpdateNode_K$(b3, . . . ), RelevantUpdates= (c3, (1, 2), (5, 2)) and therefore we remove the record (c3, (1, 2), True)) from b3.KeyInfo and add the record (c3, (5, 2), True)). We set b3.changes to {((1, 2), null), ((5,2), c3)}.

4. Updating nodes: Second stage. In this stage we update the Join Nodes we reached so far and continue to move up the tree. We advance gradually, each time updating nodes up to the next Join Node. This stage is executed in function FromJN, depicted in FIG. 15. This function uses the functions UpdateNode$_K$ (depicted in FIG. 8) and UpdateNode$_{KR}$ (depicted in FIG. 9). It also uses the function UpdateJNNode$_K$ (see bold line in FIG. 15), depicted in FIG. 16. This function is very similar to UpdateNode$_K$. The difference is that UpdateNode$_K$ receives changes from exactly one child. UpdateJNNode$_K$, on the other hand, needs to handle changes propagated through possibly several children. These changes are processed in the function ProcessChangesJN, depicted in FIG. 17 (instead of calling ProcessChanges as in UpdateNode$_K$).

In this stage of our running example, we update the Join Node b1. First we call UpdateJNNode$_K$ (b1, KUpdates). In this function call, we first process the changes in b1's children (i.e., x.changes for each child x). After updating b1.ChildrenKeyInfo, we remove (c2, (3, 2), False) from b1.KeyInfo. The key-sequence (1, 2) is not yet removed from b1.KeyInfo, since it appears with isSelectorIdentified=True.

We set b1.ChildrenKeyInfo[(5, 2)] to {(d, c2), (b3, c3)}, and therefore we do not yet add the key-sequence (5, 2) to b1.KeyInfo. Then, we process RelevantUpdates. Note that these are the tuples (n, ks, ks') ∈ KUpdates such that n is a selector-identified node of b1.

RelevantUpdates={(c1, (4, 2), (6, 2)), (c3, (1, 2); (5 2))}.

Thus, we remove (c1, (4, 2), True) and (c3, (1, 2), True), and add (c1, (6, 2), True) and (c3, (5, 2), True). b1.RemovedSequences is set to {(1, 2), (3, 2), (4, 2)}. Then, we call UpdateNode$_{KR}$(b1, KRUpdates). In this function call, we successfully verify that the key-sequence (6, 2) appears in b1.KeyInfo, replace the record (e, (1, 2)) in b1.KeyrefInfo with (e, (6, 2)) and verify that b1.KeyrefInfo does not contain any key-sequences that appear in b1.RemovedSequences. Note that if e.f was not changed from 1 to 6 then this check would fail and the update would be invalid. The KeyInfo, ChildrenKeyInfo and KeyrefInfo structures following the update are depicted in FIG. 13.

Complexity

In order to perform nm changes (as a transaction), the data structures (KeyInfo, ChildrenKeyInfo and KeyrefInfo) of at most O(m*h) nodes need to be updated. In order to update each one, we need to perform at most O(m*h) lookups (of key-sequences and of selector-identified nodes). Since each lookup (in a search tree) takes at most O(|S|log|D|), the complexity is O(m$^2$h$^2$|S|log|D|).

2.6.3 Adding a Subtree

We define an operation AddSubTree(p, T, i), where p is a node in the document D and T is a data tree. Let root(T) be the root of T.root(T) is to be added as the i'th child of p.

The idea behind the algorithm: Adding a subtree can add new scoping nodes (and selector-identified nodes of these scoping nodes) or add new selector-identified nodes to existing scoping nodes. It cannot change the fields of existing selector-identified nodes (if a new node is a field of an existing one, it means that in the context of the existing node, a field expression evaluates to more than one node, which is not allowed). We need to identify scoping nodes and selector-identified nodes in the new subtree. We also need to verify that existing selector-identified nodes do not have new fields because of the addition. Then, we need to update the data structures associated with the nodes on the path from the point of insertion to the root (only those nodes may be affected).

The Algorithm and its Complexity

Input: A schema S, a document D (represented in memory), a node p in D a data tree T and an integer i.

Output: A result—VALID or INVALID.

Pre-conditions: D is valid with respect to S. p has at least i children (0 . . . i−1).

The data structures corresponding to D (as described in Section 2.3) have been created, and are correct (i.e., reflect the state of D).

Post-conditions: The data structures are correct. If the result is INVALID then the document is unchanged (identical to the input document). If the result is VALID, T appears as a subtree of p, where root(T) is the i'th child of p, and the document is otherwise unchanged.

Add the string values in T to the TRIE structure and update MapInfo. This takes time O(|T|*log(|D|+|T|)).

Identify scoping nodes (of K or KR) in T. This can be done in time O(|S|$^4$+|T|*log|S|, as explained in Section 2.3.3. The O(|S|$^4$) part stems from representing the schema using automata. Since this part is done once for a schema, we do not count it here and therefore this stage takes time O(|T|*log|S|). We also need to add the scoping nodes of T to KeySN and KeyrefSN, which takes time O(|T|*log|S|).

Identify selector-identified nodes in T. Keep them in the data structures NewKeySelIdent and NewKeyrefSelIdent, which are defined the same as KeySelIdent and KeyRefSelIdent, respectively, with the exception that they contain only selector-identified nodes that belong to T. The key-sequences of the nodes will be calculated in the next stage of the algorithm. Let Sel$_K$ and Sel$_{KR}$ be the selector expressions of K and KR, respectively. There are two ways to do this. 1. For every scoping node of K, execute Sel$_K$ Since there are O(|D|+|T|) such scoping nodes, and Sel$_K$ is of size O(|S|), this takes time O(|S|*(|D|+|T|)$^2$) (see [7]). 2. For every node in T, execute Sel$_K^{-1}$ (the reverse expression K of the selector Sel$_K$) and for each node in the result set check if it is a scoping node. This takes time O(|T|*(|S|*(|D|+|T|)+ h$_{new}$*log|D|)), where h$_{new}$ is the height of the new document tree (after adding T), which is at most |D|+|T|. This is done similarly for KR. Sel$_K^{-1}$ is the K reverse expression of Sel$_K$. For a node n, it returns all nodes n' such that n ∈ Sel$_K$(n').

Identify fields in T. Let f$_i$ be the field expressions of K. For every node in T, we execute f$_i^{-1}$ for every field expression f$_i$. If the result set of such an execution contains selector-identified nodes that do not belong to T (that is, nodes that are found in KeySelIdent or KeyrefSelIdent), then the update is INVALID. Otherwise, we save the information in NewKeySelIdent and in KeyFieldInfo. This is done similarly for KR. We consider the complexity of this stage. For O(|T|) nodes, we evaluate O(|S|) expressions, each of size O(|S|), where the evaluation is done on a document of size O(|D|+|T|). Therefore, this takes time O(|S|$^2$*|T|*(|D|+|T|)).

Create the KeyInfo, ChildrenKeyInfo and KeyrefInfo structures for the nodes of T. This can be done in time O(|S|$^2$*|T|$^2$log|T|), as explained in Section 2.3 (where these structures are created for a document D). As these structures are created, we also make sure that for each scoping node of K in T, there is no key-sequence that appears in more than one selector-identified node (otherwise, the update is INVALID). This is detected as records are inserted into the KeyInfo structures.

Make sure that for each scoping node s of KR in T, each key-sequence in s.KeyrefInfo appears in s.KeyInfo. This takes time $O(|S|*|T|^2*\log|T|)$.

Update the KeyInfo, ChildrenKeyInfo and KeyrefInfo structures of existing nodes. This is done by calling $Update_{New}(p, root(T))$. This function is depicted in FIG. 19. This function uses the function UpdateNodeNew, which is depicted in FIG. 20. We now consider the complexity of this stage. We execute UpdateNodeNew $O(h)$ times. In each such execution, the most time consuming operations are the searches of key-sequences in KeyInfo structures. There are $O(|T|)$ such searches (because there are at most $O(|T|)$ selector-identified nodes of K or KR in T), and each one takes time $O(|S|\log|D|)$ (searching within $O(|S|)$ levels of nested search trees). Thus the complexity of executing $Update_{New}$ is $O(|S|*|T|*h*\log|D|)$, which is at most $O(|S|*|T|*|D|*\log|D|)$.

Add the records of NewKeySelIdent to KeySelIdent.
Add the records of NewKeyrefSelIdent to KeyrefSelIdent.
Thus the complexity of the algorithm is at most $O(|S||T|^2\log|T|+|T|^2\log|D|+|S|^2||T|^2+|S||T||D|\log|D|+|S|^2|T||D|)$.

Adding a Simple-type Node
This is a simple case of adding a sub-tree, where $|T|=1$. Thus the algorithm for adding a sub-tree can be used, with complexity $O(jD|\log|D||Sj+|D||Sj^2)$.

Note that if we add a single node n, n can be a selector-identified node of K (respectively, KR) only if there is only one field in K and KR, and the field expression of K (respectively, KR) evaluates to n when executed in the context of n. This is because a field of a selector-identified node can only be the node itself or a descendant of it.

2.6.4 Deleting a Subtree
We define an operation Delete(t), where t is some node. The operation deletes the sub-tree T, rooted at t, from the document.

The Algorithm and its Complexity
We traverse the nodes of T and insert their identifiers into a search tree $NODES_T$, in order to enable us to easily check whether a node n belongs to T. This stage takes time $O(|T|\log|T|)$.

We search for each n ∈ T in KeyFieldInfo and KeyrefFieldInfo. For each n such that n is a field of s (according to KeyFieldInfo or KeyrefFieldInfo), if $s \notin T$ then the operation is INVALID. This is because in such a case, removing T will cause a field expression to evaluate to Ø on s (as it evaluates to a single node before the removal, and the field expression does not contain predicates). A search in KeyFieldInfo or KeyrefFieldInfo takes time $O(\log|D|)$, and yields $O(h)$ selector-identified nodes. The identifiers of these selector-identified nodes are searched for in $NODES_T$, in order to determine if the nodes belong to T. Therefore the complexity of this stage is $O(|T|(\log|D|+h \log|T|))$.

We update the data structures (KeyInfo, ChildrenKeyInfo and KeyrefInfo) of the nodes along the path from t.parent to root(D). This is done in function $Update_{Deletion}$ depicted in FIG. 21. In order to update the data structures of a single node, this function uses the function $UpdateNode_{Deletion}$, depicted in FIG. 22. We now consider the complexity of this stage. We execute $UpdateNode_{Deletion}$ $O(h)$ times. In each such execution, we process at most T child updates (since changes involve only key sequences that appear in T), which takes time $O(|S||T|\log|D|)$ (since we need to search for the key-sequences in the KeyInfo structure). It takes time $O(\log|D|)$ to check whether y is a scoping node. If it is a scoping node of K then we need to look for T's nodes in y.KeyInfo, which takes time $O(|T|\log|D|)$. If it is a scoping node of KR, we need to look for T's nodes in y.KeyrefInfo, and we also need to look for the key sequences that were removed from y.KeyInfo in y.KeyrefInfo. Since there are at most $|T|$ such key sequences, this takes time $O(|S||T|\log|D|)$. Therefore, each execution of $UpdateNode_{Deletion}$ takes time $O(|S||T|\log|D|)$ and the complexity of executing $Update_{Deletion}$ is $O(|S||T|*h*\log|D|)$.

For each n ∈ T, we need to remove n's entries in KeyFieldInfo, KeyrefFieldInfo, KeySN, KeyrefSN, KeySelIdent and KeyrefSelIdent. Since these are all search trees over node identifiers, the complexity of this stage is $O(|T|\log|D|)$.

The complexity of the algorithm is $O(|S||T|*h*\log|D|)$, or $O(|T|*h*\log|D|)$ for a fixed schema.

Note: In all these algorithms, if a change to the document turns out to be invalid during the course of the update operation then all changes to the data structures must be rolled back. Therefore, when changes are made to the data structures, the original data is saved in special data structures. This feature is not described here, though it was included in the implementation.

2.6.5 Handling Unique Constraints
A Unique constraint is similar to a Key constraint, but it is less restrictive. A field expression may evaluate (in the context of a selector-identified node) either to an empty set (which is not allowed for a key constraint) or to a set that contains a single node, of a simple type. The uniqueness requirement (that is, no two selector-identified nodes of the same scoping node have the same key-sequence) applies only to selector-identified nodes n such that each field expression, when evaluated in the context of n, evaluates to a set that contains a single node, of a simple type. A keyref constraint may only refer to a key constraint, not to a unique constraint. Incremental validation of unique constraints is similar to that of key constraints. For a unique constraint, the KeyInfo structure of a node n contains records only for the selector-identified nodes of n. If n is not a scoping node, n.KeyInfo is empty. We can use KeySN, KeyFieldInfo and KeySelIdent for unique constraints as we do for key constraints. Validation is fairly straight forward. For example, validating a transactional value-change operation $update((f_1, newval_1), \ldots, (f_m, newval_m))$ may be done as follows:

1. Find affected selector-identified nodes (using KeyFieldInfo) and compute the set of key-sequence changes KUpdates.
2. Compute the set S of scoping nodes that have some $f_i$ descendant. Each such scoping node appears only once in S, even if it has several $f_i$ descendants.
3. For each s in S:
   (a) Let RelevantUpdates be the set of records (n, ks, ks') in KUpdates such that n appears in s.KeyInfo.
   (b) For each (n, ks, ks') in RelevantUpdates, remove the record (n, ks, True) from s.KeyInfo.
   (c) For each (n, ks, ks') in RelevantUpdates, add the record (n, ks', True) to s.KeyInfo. If the addition creates a conflict (that is, $ks^0$ already appears), the update is INVALID.

3. Implementation of Incremental Validation
3.1 Overview
The implementation is based on an existing validator, called XSV [11] (XML Schema Validator). XSV is an open-source validator written in Python. It is also distributed as an application that performs validation, given URLs of a document and a schema. Internally, XSV loads the document and schema into memory, where they are represented based on an object model, with classes such as Schema, Document and Element. Then it performs in-memory validation, using its validate function, that receives an Element and a Schema object. In order to validate key and keyref constraints, XSV keeps a data structure called keyTabs for every node of the document (an instance of the Element class). This structure is very similar to our KeyInfo structure. It is a dictionary that maps a key constraint to a keytab. The keyTab is a dictionary that maps key-sequences (represented as tuples of values) to nodes. Our implementation uses a modified version of XSV in order to load the document into memory and create the necessary data structures. Incremental validation is performed on the in-memory representation of the document. We have implemented the algorithms so that they support any number of key and keyref constraints. The data structures keep information for all constraints defined in the schema (and allow access according to a key or keyref constraint). When the data structures of a node are updated, we update the information pertaining to all keys defined in the schema. If a key sequence ks is removed from n.keyTabs[K] (where K is a key constraint), we check that there is no reference to ks in n.KeyrefInfo[KR] for every keyref KR that refers to K.

3.1.1 Validation in XSV

When given the URLs of a document and a schema, XSV loads them into memory, where they are represented as a Document and a Schema object, respectively. Each type defined in the schema is represented by a Type object. Each complex type is associated with an FSM object that represents a finite state machine that corresponds to the type's content model. The document element and the schema object are passed to the validate function, and it calls the validateElement function. The content model of an element is validated in the function validateContentModel. This model can be empty, text only, or complex (i.e., an element with children, possibly an element with mixed content). In the latter case, validation is done in the validateElementModel function. This function applies the appropriate FSM to the element, and assigns types to the child elements according to the FSM. After validating the content model, validateElement calls validateChildTypes, which in turn calls validateElenment for each child element. After validating the content model and the child elements (if there are any), validateElement calls validateKeys. This function receives an element node n, and an element declaration decl, that contains a list of all key and keyref constraints which are defined in the corresponding schema element (i.e., n is a scoping node of each key and keyref in decl). For each key K in decl, this function creates a keyTab, n.keyTabs[K]. The keyTab is a dictionary that maps key-sequences (i.e., tuples of values) to selector-identified nodes. n.keyTabs[K] is created by evaluating the selector expression of K in the context of n, and evaluating the field expressions for each resulting selector-identified node. For each resulting selector-identified node s, whose key-sequence is ks, n.keyTabs[K] maps ks to s. A validation error is reported if a field expression does not evaluate to a single simple-type node, or if two selector-identified nodes of n have the same key-sequence. Then, information from the keyTabs of n's children is propagated to n.keyTabs. For each child c, key K', key-sequence ks' and node n', such that c.keyTabs[K'][ks']=n', (ks', n') is propagated to n.keyTabs[K'] (i.e., n.keyTabs[K'][ks']=n') if the following conditions are satisfied.

1. There is no other child c' of n such that ks' appears in c'.keyTabs[K'].
2. ks' does not already appear in n.keyTabs[K'] (i.e., there is no selector-identified node of n (for key K') whose key-sequence is ks'.

Note that n.keyTabs[K'] may contain key-sequences from child keyTabs, even if n is not a scoping node of K'.

The keyTabs are created bottom up. Since validateElement calls validateKeys only after validating the child elements, validateKeys is called for n only after it has been called for n's children (and the children's keyTabs have been created).

Figure 23:
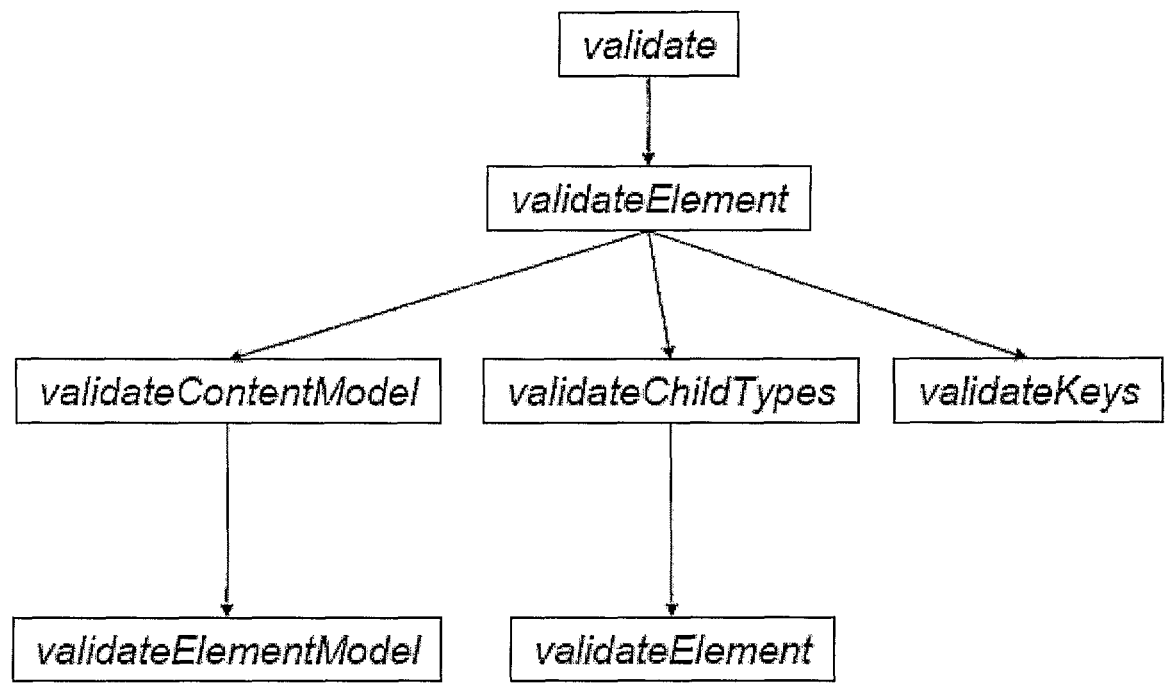
FIG. 23 illustrates a simplified description of XSV's flow of execution.

After creating n's keyTabs, validateKeys checks the keyref references. For each keyref KR in decl, the selector expression of KR is evaluated in the context of n, and the field expressions are evaluated for each resulting selector-identified node. For each resulting key-sequence ks, a validation error is reported if n.keyTabs[KR.refer] does not contain a mapping for ks (i.e., if there is no entry n.keyTabs[KR.refer][ks]), where KR.refer is the key constraint that KR refers to. The above (simplified) description of XSV's flow of execution is illustrated in FIG. 23.

3.1.2 Modifications to XSV

We have created a modified version of XSV, called XSV+ as an embodiment of the present invention. The modifications are as follows.

- Added a module for structural validation only, with no validation of identity constraints. This module, called StructuralValidation, contains a modified version of the validateElement function (and a validate function that calls it), that does not call the validateKeys function. This module is useful for checking the performance improvement of incremental validation, by validating structural constraints from scratch using this module and validating key and keyref constraints incrementally. The results can be compared to validation from scratch of both structural constraints and identity constraints. Furthermore, the difference between the times of full validation from scratch and of structural validation from scratch may be used as an estimate of the time it takes XSV to validate identity constraints from scratch.
- Changed the keyTab structure so that n.keyTab[ks] contains not only a node but also an indication of whether it is a selector-identified node of n, i.e., n.keyTab[ks]=(n, isSelectorIdentified).
- Added data structures needed for the algorithms.
- Modified the code of the validateKeys function, so that it adds information to the new data structures. As a result, after an initial validation of the document from scratch using the XSV+, the data structures contain all the needed information (which is maintained by the incremental algorithms).
- Added functions that implement the incremental validation algorithms.

3.2 Implementation Details 3.2.1 Data structures

In order to enable fast lookups, most data structures use dictionaries (which are similar to hash tables, and are very easy to use in Python).

KeySelIdent. A dictionary that maps a key constraint to another dictionary, which maps selector-identified nodes to their key-sequences. That is, for a key $K_1$ and a selector-identified node n of $K_1$, whose key-sequence is ks, KeySelIdent[$K_1$][n]=ks (KeySelIdent does not support access according to a key-sequence, nor is such access needed).

KeyrefSelIdent. A structure similar to KeySelIdent, used for keyref constraints. KeyrefSelIdent[KR1][n]=ks.

KeyFieldInfo. For each key constraint, maps a field node to a list of the node's occurrences as a field, where an occurrence is identified by a selector-identified node and the index of the field in this node's key-sequence. KeyFieldInfo[$K_1$][field]=[(node1, index1), (node2, index2), . . . ] (note that it is possible for a node n to appear twice in the list of occurrences, if two different field expressions evaluate to the same field node in the context of n).

KeyrefFieldInfo. Similar to KeyFieldInfo. KeyrefFieldInfo[$KR_1$][field]=[(node1, index1), (node2, index2), . . . ].

KeyScopingNodes. Holds the scoping nodes of every key constraint. KeyScopingNodes[$K_1$] is a dictionary that holds all scoping nodes of $K_1$ as keys (the values are irrelevant).

KeyrefScopingNodes. Similar to KeyScopingNodes.

n.keyTabs holds key information for a node n. n.keyTabs[$K_1$][ks]=(s, isSelectorIdentified), where $K_1$ is a key constraint, ks is a key-sequence, s is a node (a selector-identified node of n or one of n's descendants) and isSelectorIdentified is a boolean value.

n.KeyrefInfo holds keyref information for a node n. If n is a scoping node of a keyref $KR_1$, s is a selector-identified node of n, the key-sequence of s is ks and the key-sequence ks appears in counter selector-identified nodes of n, then n.KeyrefInfo[$KR_1$][ks]=counter and n.KeyrefInfo[$KR_1$][s]=ks.

The following data structures hold information that is used for performing a rollback of the changes made to the other data structures by an incremental validation algorithm.

keyTabsRollbackInfo. Holds information used to roll back changes made to the keyTabs structures. If n.keyTabs[K][ks]=(s, b) and then the entry for n.keyTabs[K][ks] changes, the old entry is saved in keyTabsRollbackInfo, i.e., keyTabsRollbackInfo[n][K][ks]=(s, b). In the case where an entry is added by the validation algorithm, but no entry existed beforehand, s and b are null.

KeyrefInfoValueChangeRollbackInfo. Holds information used to roll back changes made to the KeyrefInfo structures, specifically changes to the key-sequences of selector-identified nodes (these changes are made by the algorithms that validate value changes). If n.KeyrefInfo[KR][s]=ks and then the key-sequence of s changes, this information is saved in KeyrefInfoValueChangeRollbackInfo, i.e., KeyrefInfoValueChangeRollbackInfo[n][KR][s]=ks.

KeyrefInfoAdditionRollbackInfo. This data structure is similar to KeyrefInfoValueChangeRollbackInfo, but saves information regarding selector-identified nodes that were added. That is, if s is a new selector-identified node of n (added by the algorithm for adding a subtree) for keyref KR, with key-sequence ks, then KeyrefInfoAdditionRollbackInfo[n][KR][s]=ks.

KeyrefInfoDeletionRollbackInfo. This data structure is similar to KeyrefInfoValueChangeRollbackInfo, but saves information regarding selector-identified nodes that were deleted. That is, if s is a deleted selector-identified node of n (i.e., s is a part of a subtree that is deleted by the algorithm for deleting a subtree) for keyref KR, with key-sequence ks, then KeyrefInfoDeletionRollbackInfo[n][KR][s]=ks.

3.2.2 Populating the Data Structures

In XSV+, as part of the execution of the validateKeys function on a node n, we add relevant information to the data structures. As we build the keyTabs for n (as in XSV), we add the additional boolean isSelectorIdentified to each entry. If n is a scoping node of a key K, the selector expression of K is evaluated. For each resulting selector-identified node s, the field expressions are evaluated to produce field nodes $f_i$ (where i is the index of a field of the key), whose values combine to create a key-sequence ks. As these evaluations are done, we add the following information to the data structures:

KeyScopingNodes[K][n]=True
KeySelIdent[K][s]=ks
KeyFieldInfo[K][$f_i$]+=(s, i)

Similar information is added for keyrefs. If n is a scoping node of a keyref KR, the selector expression is evaluated. For each resulting selector-identified node s, the field expressions are evaluated to produce field nodes $f_i$, whose values combine to create a key-sequence ks. As these evaluations are done, we add the following information to the data structures:

KeyrefScopingNodes[KR][n]=True
KeyrefSelIdent[KR][s]=ks
KeyrefFieldInfo[KR][$f_i$]+=(s, i)

3.2.3 Incremental Validation Functions validateFieldChange(document, schema, field, newVal). Receives a document, a schema, a field (an object which is an instance of the XMLInfoset.Element class) and a new value. The function changes the value of the field and updates the data structures according to the algorithm for changing a single value. If, during the execution of the algorithm, a violation of constraints is discovered, all updates to the data structures are rolled back and the field is changed back to its original value.

validateFieldChanges(document, schema, changeList). Implements the algorithm for transactional changes. changeList is a list of tuples, each tuple of the form (field, new Val).

validateAddition(document, schema, parent, child, index). Implements the algorithm for adding a subtree. parent is an existing node of the document and child is a new node (the root of a subtree), to be added as the i'th child of parent. The child object may be created by loading an XML file into memory, and using the document element of the resulting Document object as child.

validateDeletion(document, schema, t). Implements the algorithm for deleting a subtree. t is an existing node of the document, that needs to be deleted (along with its subtree).

3.3 Designing a Fully Incremental Validator

Incremental structural validation is mostly local to the changed node and possibly its parent:

When changing the value of a simple-type node, we need to check that the new value conforms to the type of the node.

When adding a subtree as the child of a node p, we need to first structurally validate the new subtree, and then check that, after the addition, the string created by concatenating the labels of p's children belongs to the regular language defined by p's type.

When deleting a subtree which is the child of a node p, we need to check that, after the deletion, the string created by concatenating the labels of p's children belongs to the regular language defined by p's type.

Also, the validity of ID and IDREF attributes needs to be checked. This can be done by using a data structure that holds all ID values in the document and allows logarithmic access time, as described in [10].

Algorithms for adding and deleting a subtree are presented in [10], whereas [9] presents algorithms for adding and deleting a leaf node. Both present techniques for effciently checking whether, after adding a node/subtree as a child of a node p (respectively, deleting a node/subtree which is a child of a node p), the string created by concatenating the labels of p's children belongs to the regular language defined by p's type.

Algorithms for incremental structural validation can easily be combined with our algorithms for incremental validation of key and keyref constraints, by simply performing the structural validation and then, if successful, validating key and keyref constraints. It seems that there is no point in coupling the structural validation and the key and keyref validation more tightly, since they check significantly different aspects of the document, and since structural validation does not need to traverse the path from the point of change to the root.

When adding a subtree, a structural algorithm needs to traverse the new subtree in order to structurally validate it. This can be used to collect information needed for validation of key and keyref constraints, thus improving performance. Note, however, that this does not improve the time complexity of the combined algorithm.

4. Experimentation 4.1 Specification of Experiments

In order to determine how much time is saved by checking key and keyref constraints incrementally, the experiments consist of performing a series of changes of the same type (i.e., changing the value of a node, changing several values, adding a subtree or deleting a subtree) on the in-memory representation of the document, and calculating the average validation time per change. We calculate the average validation time using two different validation methods:

1. Re-validate the entire document, using the validate function of XSV.
2. Re-validate the entire document with respect to structural constraints only (using the StructuralValidation module of XSV+), and then call the appropriate incremental algorithm for validating key and keyref constraints.

In this way, we compare full validation (structural constraints and identity constraints) using two different methods. One performs full validation from scratch, while the other performs only structural validation from scratch, and checks key and keyref constraints incrementally. The time difference between the two methods is clearly due to the incremental checking of key and keyref constraints.

Our experiments show that running the incremental algorithms often takes about 0.01 (1%) of the time it takes to run structural validation from scratch. Thus, the comparison described here does not give a clear picture of the improvement gained by using incremental validation of key and keyref constraints. It would be better to compare the time it takes to incrementally check key and keyref constraints with the time it takes to validate only these constraints from scratch. Denote the time it takes to re-validate the document (both structural constraints and identity constraints) by $T_{scratch}$. Denote the time it takes to re-validate the document with respect to structural constraints by $T_{struct}$. Denote the time it takes to validate key and keyref constraints incrementally by $T_{inc}$. $T_{scratch}-T_{struct}$ is a good estimate of the time it takes to validate key and keyref constraints from scratch. Comparing this to $T_{inc}$ gives a good estimate of the improvement gained by incrementally validating key and keyref constraints.

Figure 25:
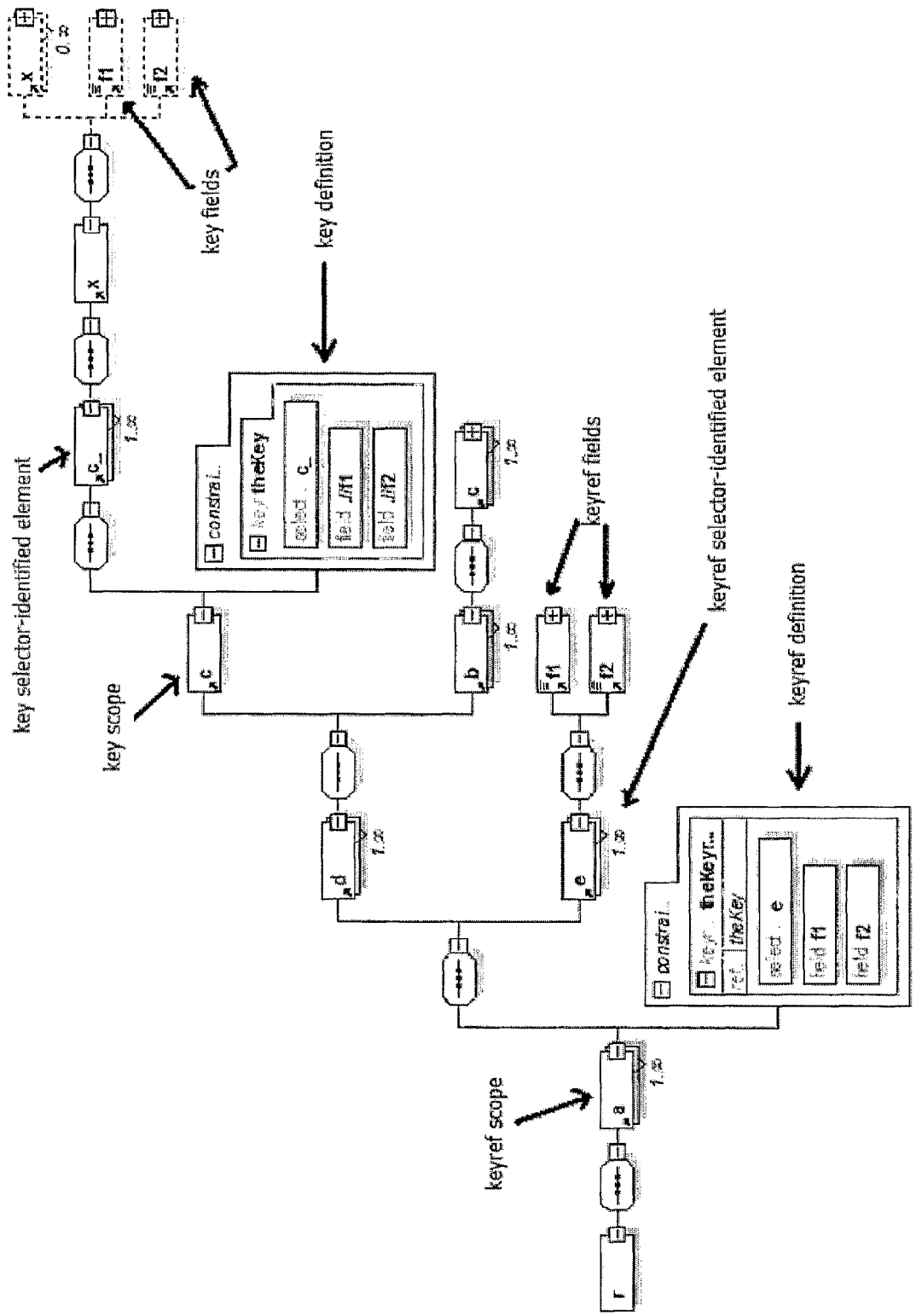
FIG. 25 is another view of the schema used for validation experiments.

All tests were done on a P-4 2.8 GHz PC with 1 GB RAM. Testing was done on documents that conform to the schema depicted in FIG. 24. The schema is also illustrated in FIG. 25, that shows the structure of elements as a tree, where elements that may appear in a sequence of one or more instances are marked with 1 . . . ∞. We generated three conforming documents, of sizes 346 KB, 682 KB and 1.41 MB. When generating a document, the number of child nodes at each level was chosen randomly in the following manner. The generation function received a size parameter. The number of 'a' elements was chosen uniformly from the range 1 . . . size. For each 'a' element, the number of 'd' child elements was chosen in the same manner. For each 'd' element, the number of 'b' child elements was also chosen in the same way. For each 'b' element, the number of 'c' child elements was chosen uniformly from the range 1 . . . 2* size. For every 'c' element, The number of 'c' child elements was chosen uniformly from the range 1 . . . 2* size. For every 'a' element, 4* size key sequences were chosen, and size 'e' elements were generated for each one. The documents mentioned above were generated with size parameters 4, 5 and 6, respectively. Node values were chosen so there would be a fair amount of "cancellations", i.e., a key sequence appearing in the KeyInfo structures of siblings.

4.1.1 Single-Value Change

For each document, we generated a sequence of single value changes. The fields to be changed and the new values were selected at random, in a way that induced diversity in the experiments. Each change had a ⅔ probability to change a key field and a ⅓ probability to change a keyref field.

Changes to key fields were selected by the following algorithm.

With 80% probability: Choose a key field uniformly from all key fields in the document. The new value is either chosen from the existing values of fields in the document or chosen to be 1+ the maximum existing value of a field in the document (50% probability for each case). Such changes are usually valid, since most selector identified nodes of the key are not referenced and therefore can be safely changed (as long as the new key sequence does not violate the key constraint).

With 20% probability: Choose a change so that it would most likely fail. Choose a keyref field randomly. Find the corresponding key selector-identified node, and change its corresponding field. The new value is either chosen from the existing values of fields in the document or chosen to be 1+ the maximum existing value of a field in the document.

Changes to keyref fields were selected as follows. Choose a keyref field randomly. For example, suppose it is an f1 field. Let p be its parent node. Choose the new value as follows.

With 80% probability: Try to perform a valid change. Within the ancestor 'a' node, search for key selector-identified nodes that have a key-sequence with the same f2 value as p but a different f1 value. If such nodes exist, choose the new f1 value randomly from their f1 values. Otherwise (this change will be invalid), choose the value from the ones that currently exist in the document.

With 20% probability: Choose a random value from the values that exist in the document. Thus, the change will most likely be invalid.

4.1.2 Multiple-Value Change

We ran tests on the 346 KB document. Each test is a sequence of transactional changes, and each transactional change consists of TRANSACTION SIZE random simple-type node value changes, where TRANSACTION SIZE 2 f100, 150, 200, 300; 700; 1000 g varies from test to test. We performed the tests both with XSV (i.e., validation from scratch) and with XSV+ (i.e., validation from scratch of structural constraints by calling validate NoKeys, and incremental validation of key and keyref constraints by calling validate-FieldChanges). We also performed the tests using XSV with both full validation from scratch and structural validation from scratch (in order to calculate the difference between the two), and using XSV+ with incremental validation only (i.e., no structural validation).

4.1.3 Addition

In order to check the addition algorithm, we changed the schema by allowing a 'c' element to have a 'cp' child (in addition to its 'c' children), where a 'cp' element is defined as follows.

```
<xs:element name="cp">
    <xs:complexType>
        <xs:sequence>
            <xs:element ref="c" minOccurs="0"
                maxOccurs="unbounded"/>
            <xs:element ref="c_" minOccurs="0"
                maxOccurs="unbounded"/>
            <xs:element ref="e" minOccurs="0"
                maxOccurs="unbounded"/>
        </xs:sequence>
    </xs:complexType>
</xs:element>
```

We also changed the selector expression of the key from c_ to c_ \cp/c_, and changed the selector of the keyref from e to .//e. Thus, by adding a subtree whose root is a 'cp' node, we can simultaneously add a new key scoping node (a 'c' child of the new 'cp' node), new key selector-identified nodes to an existing scoping node (the parent 'c' node to which we add a 'cp' child), and new keyref selector-identified nodes to an existing scoping node (the ancestor 'a' node).

We created several XML files, of different sizes, each contains a subtree rooted at a 'cp' node: a 7.5 KB subtree, a 24 KB subtree, and two 71 KB subtrees, one without 'e' nodes and one with 'e' nodes. We tried adding each one of the subtrees to each one of the three XML documents. For each combination of document and subtree, we loaded the document and subtree to memory, and ran a series of tests. In each test, we added the subtree as a child of the first 'c' node (in document order), and randomized the field values of the subtree (by replacing some of them with new values).

Measurements were taken in both ways described above: (1) [Full validation from scratch] vs. ([structural validation from scratch]+[incremental validation of key and keyref constraints]). (2) ([Full validation from scratch]−[structural validation from scratch]) vs. [incremental validation of key and keyref constraints].

In order to be able to perform a sequence of addition operations, of structurally equivalent subtrees (with different field values), to the same location in the tree, and without violating structural constraints, we removed the added subtree from the document after every operation, and rolled back the changes made to the data structures.

4.1.4 Deletion

In order to check the deletion algorithm, we changed the schema by making all elements optional (i.e., minOccurs=0), so that deletion does not violate structural constraints (which would make checking key and keyref constraints pointless). For each one of the three XML documents, we performed a series of deletion operations. For each deletion, we chose the node to be deleted (along with its subtree) as follows. With a 5% chance, we chose randomly from the field nodes (i.e., nodes that serve as a field of some selector-identified node). Such a deletion is bound to fail, since it causes a field expression to evaluate to an empty set for some selector-identified node. With a 95% chance, we chose randomly from the non-field nodes. In order to be able to perform a sequence of deletion operations without drastically reducing the size of the document, we re-attached the deleted subtree to the document after every operation, and rolled back the changes made to the data structures.

4.2 Results and Analysis

4.2.1 Setup

Figure 26:
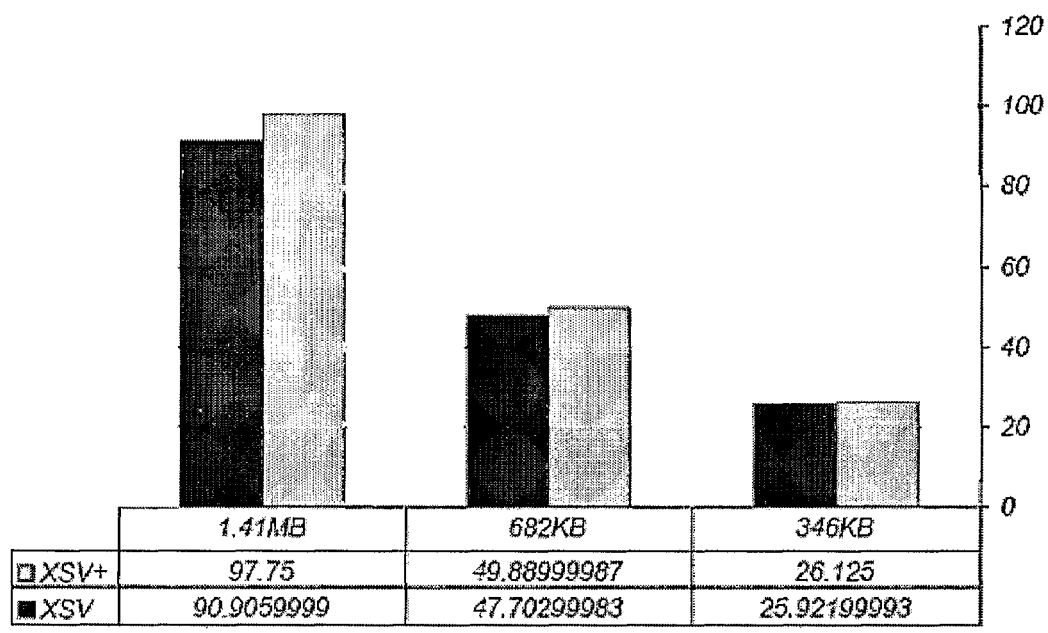
FIG. 26 illustrates XSV vs. XSV+: Setup times (seconds).

The setup time, i.e., the time to perform the initial validation given the URLs of a document and a schema is slightly larger in XSV+ than in XSV (see FIG. 26). This is because XSV+ collects more information during validation. For the 346 KB document, setup time is 25.9 seconds in XSV and 26.1 seconds in XSV+ (a 0.77% increase). For the 682 KB document, it is 47.7 seconds in XSV and 49.9 seconds in XSV+ (a 4.6% increase). For the 1.41 MB document, it is 90.9 seconds in XSV and 97.75 seconds in XSV+ (a 7.5% increase).

Now we show, for each type of test, the following measurements:

1. The average time of checking structural constraints from scratch and identity constraints incrementally, compared with the average time for full validation from scratch.
2. The average incremental validation time ($T_{inc}$), compared with the average time of validation of key and keyref constraints from scratch (calculated by $T_{scratch} - T_{struct}$).

4.2.2 Single-Value Change

Figure 27:
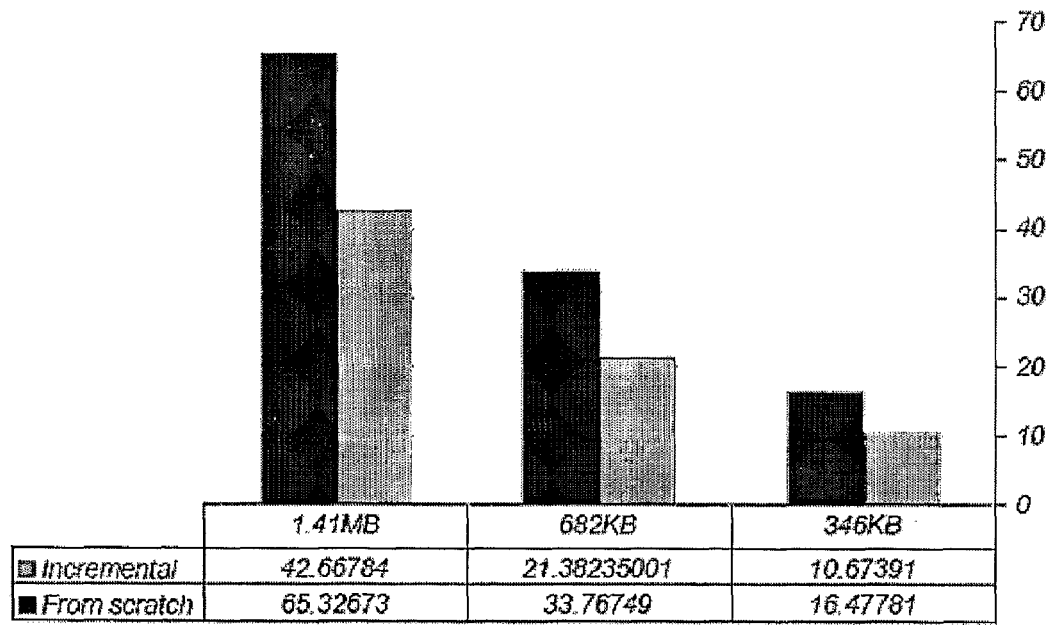
FIG. 27 shows the average time per single value change (seconds), comparison 1.
Figure 28:
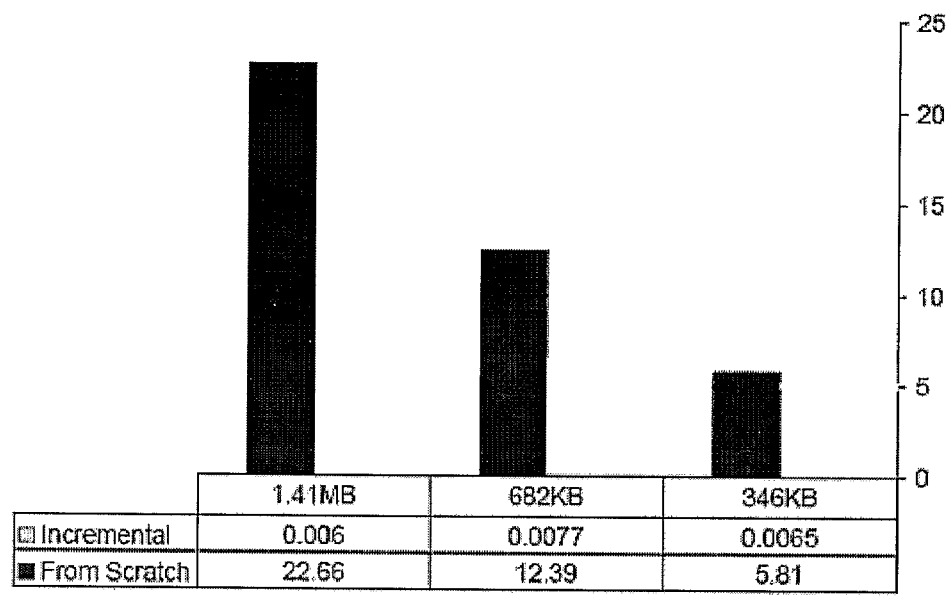
FIG. 28 shows the average time per single value change (seconds), comparison 2.

FIG. 27 shows the results using comparison (1) above (the average time of checking structural constraints from scratch and identity constraints incrementally, compared with the average time for full validation from scratch). The incremental validation time is significantly shorter, even if we take into account the larger setup time of XSV+ (an improvement of over 30%). FIG. 28 shows the results using comparison (2) (the average incremental validation time ($T_{inc}$), compared with the average time of validation of key and keyref constraints from scratch (calculated by $T_{scratch} - T_{struct}$)). These results allow us to see the dramatic speedup of key and keyref validation, gained by using the incremental algorithm.

4.2.3 Several Value Changes

Figure 29:
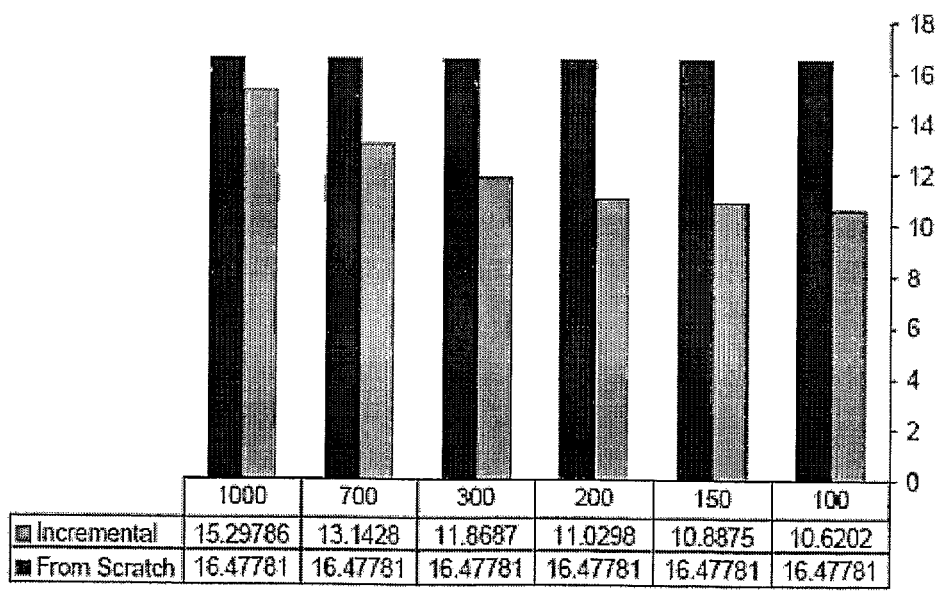
FIG. 29 shows the average time per transactional change (seconds), for a 346 KB document, comparison 1.
Figure 30:
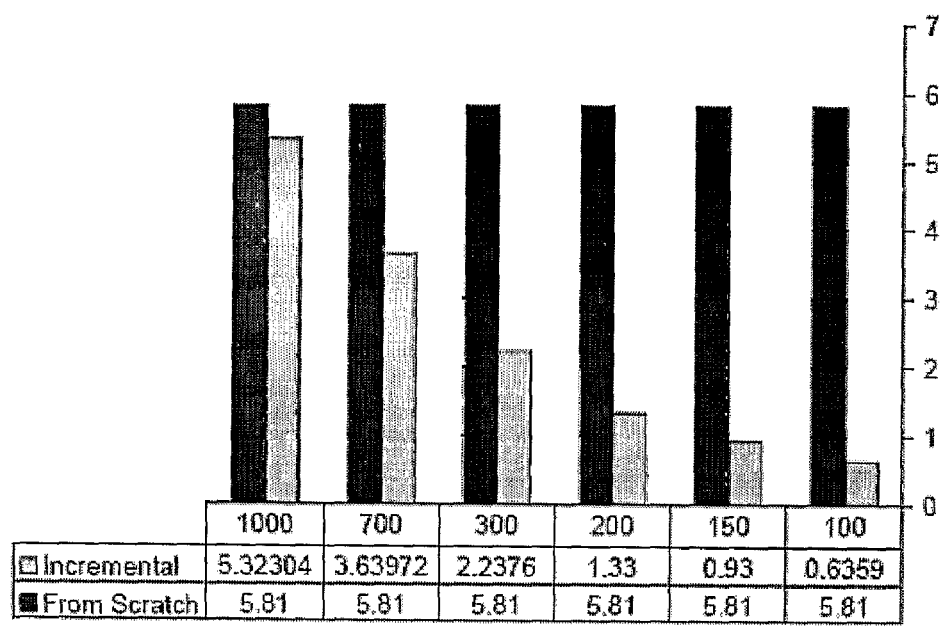
FIG. 30 shows the average time per transactional change (seconds), for a 346 KB document, comparison 2.

FIG. 29 shows the results using comparison (1). FIG. 30 shows the results using comparison (2). Results are shown for different TRANSACTION SIZE values. The time to validate from scratch is independent of TRANSACTION SIZE. Incremental validation, on the other hand, becomes slower as TRANSACTION SIZE increases.

4.2.4 Addition

Figure 31:
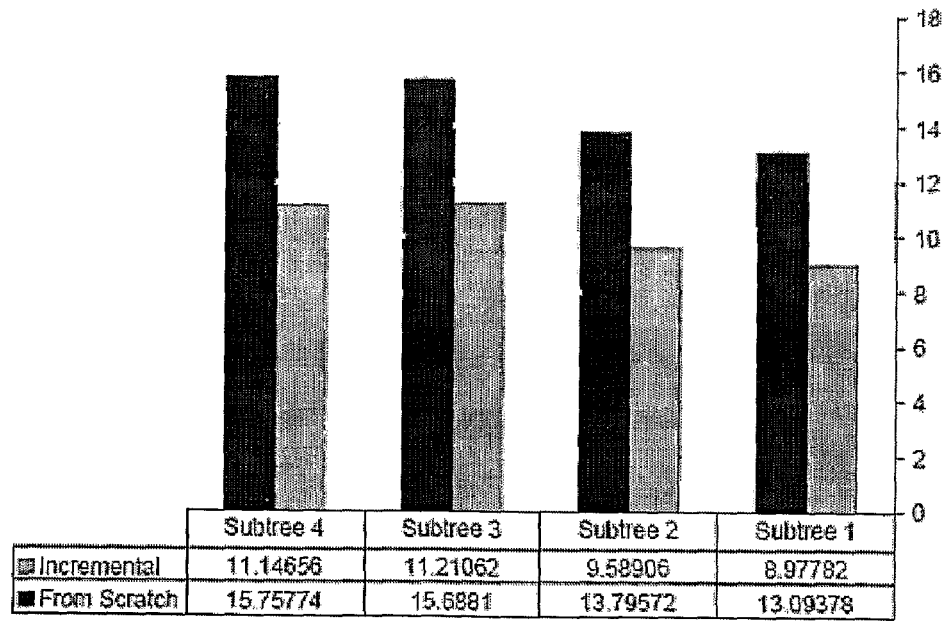
FIG. 31 shows the average time per addition operation (seconds), for a 346 KB document, comparison 1.
Figure 32:
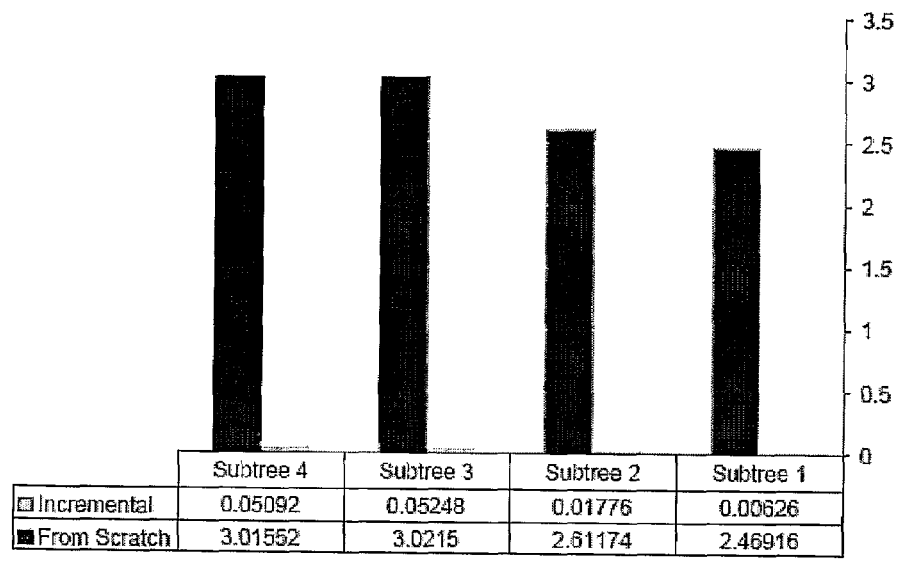
FIG. 32 shows the average time per addition operation (seconds), for a 346 KB document, comparison 2.
Figure 33:
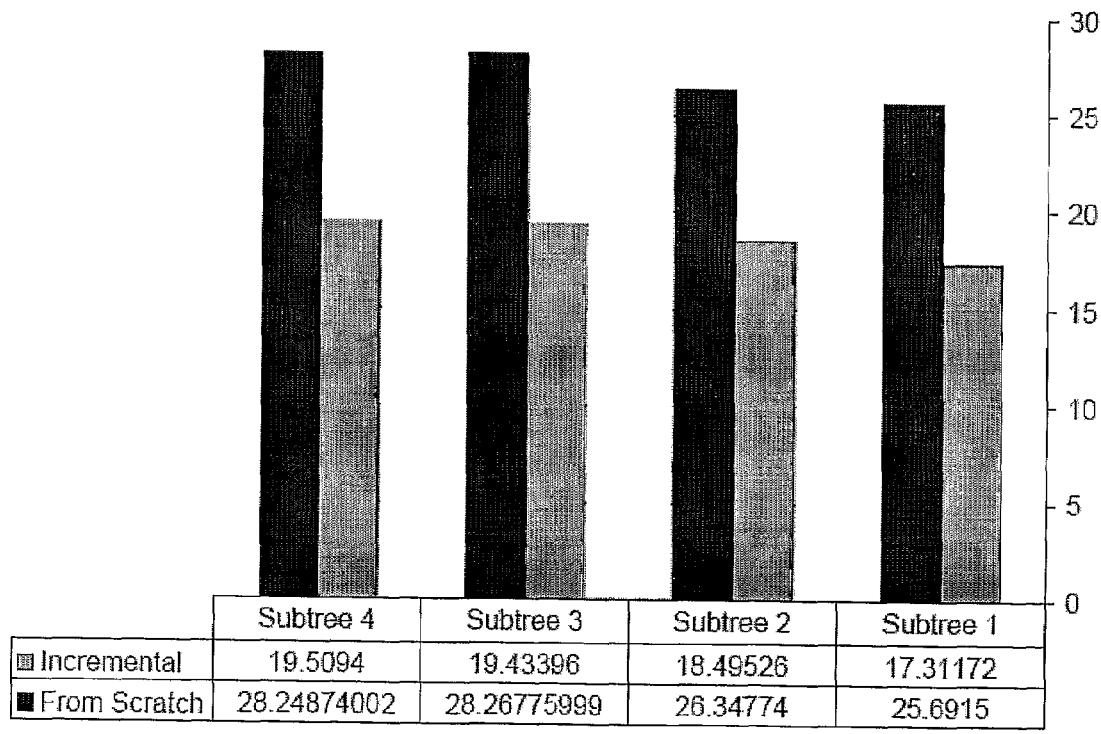
FIG. 33 shows the average time per addition operation (seconds), for a 682 KB document, comparison 1.
Figure 34:
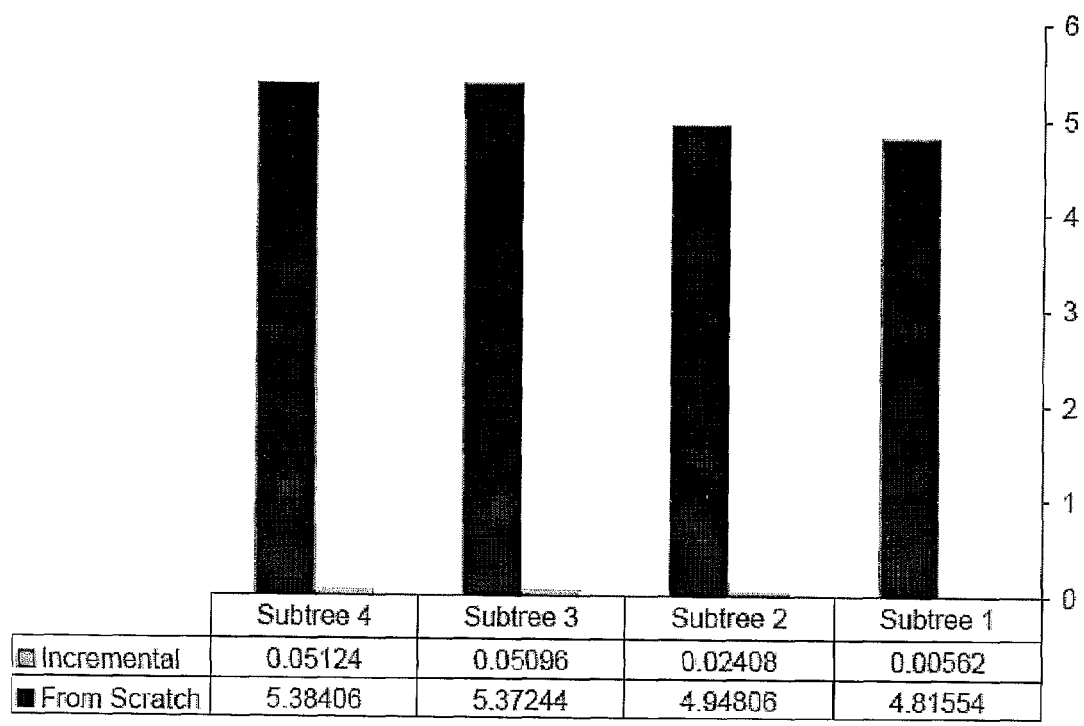
FIG. 34 shows the average time per addition operation (seconds), for a 682 KB document, comparison 2.

FIG. 31 shows the results using comparison (1), for the 346 KB document. FIG. 32 shows the results using comparison (2), for the 346 KB document. FIG. 33 shows the results using comparison (1), for the 682 KB document. FIG. 34 shows the results using comparison (2), for the 682 KB document. Results for the 1.41 MB document are similar.

The results (for all documents) show a speedup of roughly two orders of magnitude in comparison 2, and roughly 30% in comparison 1. Naturally, validation times, both incremental and from scratch, become longer as the subtree becomes larger.

4.2.5 Deletion

Figure 35:
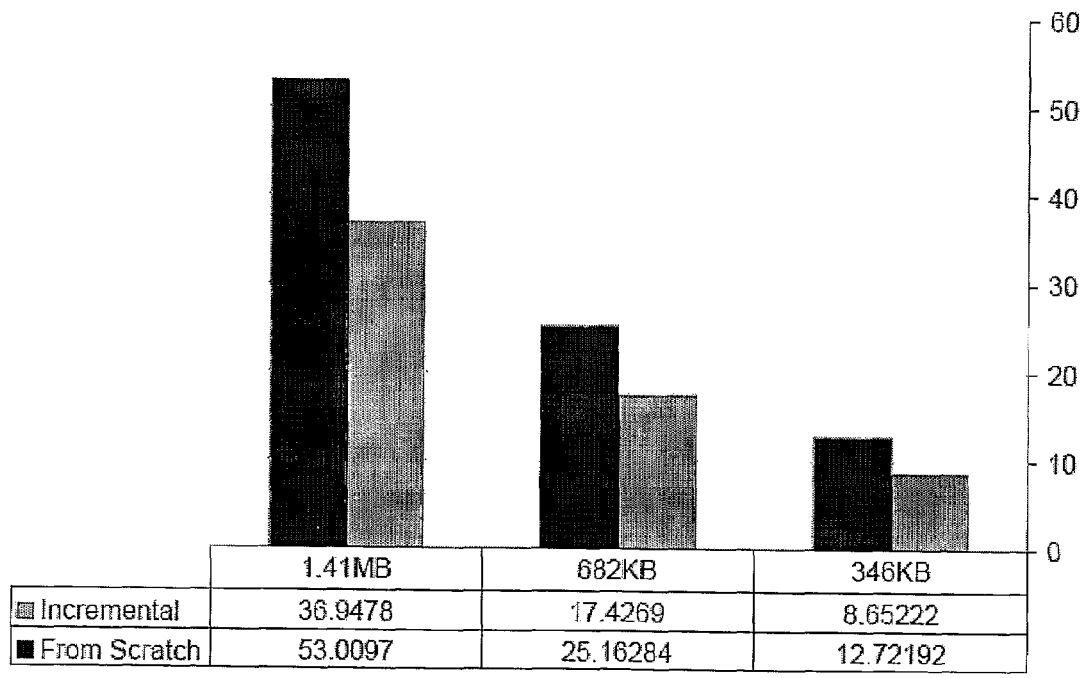
FIG. 35 shows the average time per deletion operation (seconds), comparison 1.
Figure 36:
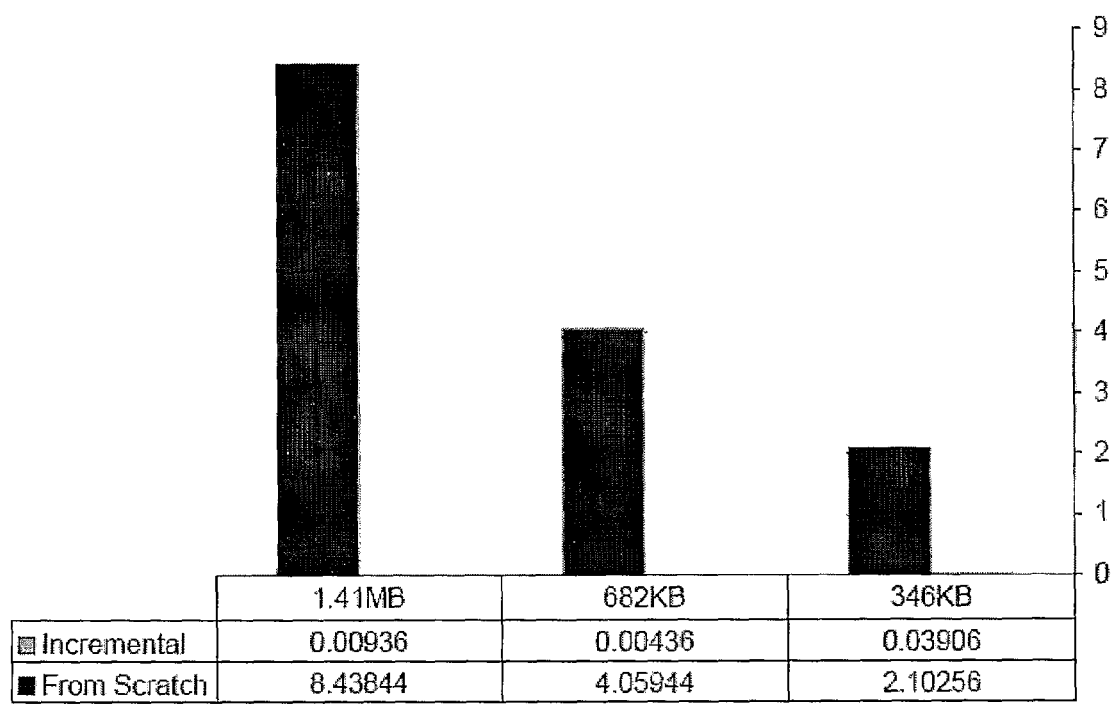
FIG. 36 shows the average time per deletion operation (seconds), comparison 2.

FIG. 35 shows the results using comparison (1). FIG. 36 shows the results using comparison (2). The results show a 30% speedup in comparison 1, and a speedup of two orders of magnitude in comparison 2.

4.3 Space Consumption

We measured the space (i.e., amount of memory) consumed by the Python application before and after loading the document into memory (and populating the data structures in the process). We measured this for XSV and for XSV+, in order to see how much more memory our data structures require. Before loading the document, the Python process takes up 7MB of memory.

When loading documents with XSV, the memory consumption is as follows.

After loading the 346 KB document, the memory consumption is 53 MB.

682 KB document=>96 MB of memory consumption.

1.41 MB document=>193.5 MB of memory consumption.

When loading documents with XSV+, the memory consumption is as follows.

After loading the 346 KB document, the memory consumption is 59 MB (an 11. % increase compared to XSV).

682 KB document=>107 MB of memory consumption (an 11.46% increase compared to XSV).

1.41 MB document=>216.7 MB of memory consumption (an 11.99% increase compared to XSV).

The memory consumption of XSV+ is quite high, but that is the case also for XSV. The added data structures of XSV+ increase the memory consumption by less than 12%.

Appendix A

Incremental Validation Implementation: XSV+

We present code samples from the implementation.

A.1 Single-Value Change

A.1.1 validateFieldChange( )

This is the main function that implements the algorithm.

Parameters: doc is an XML document, s is a schema, field is a node in the document, newVal is a value and outFile is a file object, to which validation result and time measurement are written.

```
def validateFieldChange(doc,s,field,newVal,outFile):
    .
    .
    # Structural Validation
    validate_NoKeys(doc.documentElement, s, None)
    .
    .
    (keyUpdates,keyrefUpdates)=
    getKeyAndKeyrefUpdates([(field,newVal)])
    # Update the data structures
    try:
        updatePath(field, keyUpdates, keyrefUpdates)
        commitChanges(keyUpdates,keyrefUpdates)
        res=True
    except:
    .
    .
    return
```

A.1.2 getKeyAndKeyrefUpdates( )

This function receives a list of _eld changes of the form (fieldNode; newValue) and prepares the lists of key-sequence changes keyUpdates and keyrefUpdates. It implements the first stage ('Finding affected nodes') of the algorithms for single value change and for transactional change.

```
def getKeyAndKeyrefUpdates(fieldChanges):
    # A dictionary. keyUpdates[n]=(ks,ks'), where n is
    # a key selector-identified node, whose key-sequence
    # stands to be changed from ks to ks' due to the field changes.
    keyUpdates={ }
    # A dictionary. keyrefUpdates[n]=(ks,ks'), where n is
    # a keyref selector-identified node, whose key-sequence
    # stands to be changed from ks to ks' due to the field changes.
    keyrefUpdates={ }
    # Calculate key updates
    for (key,keyFieldInfo) in KeyFieldInfo.items( ):
        # updates for this key
        keyUpdates1={ }
        for (field, newVal) in fieldChanges:
            if keyFieldInfo.has_key(field):
                for (node, index) in keyFieldInfo[field]:
                    oldSeq = KeySelIdent[key][node]
                    seq=oldSeq
                    if (keyUpdates1.has_key(node)):
                        seq=keyUpdates1[node][1]
                    newSeq = seq[0:index]+tuple([newVal])+
                    seq[(index+1):len(seq)]
                    keyUpdates1[node]=(oldSeq, newSeq)
        if keyUpdates1!={ }:
            keyUpdates[key]=keyUpdates1
    # Calculate keyrefUpdates
    .
    .
    return (keyUpdates,keyrefUpdates)
```

A.1.3 updatePath( )

```
def updatePath(startNode, keyUpdates, keyrefUpdates):
    updatePathToJoinNode(startNode, None, None, { }, keyUpdates,
    keyrefUpdates)
```

A.1.4 updatePathToJoinNode( )

Following one or more value changes of fields in the document, which cause key-sequences in the document to change, this function updates the data structures associated with nodes along a path, starting from a specified node and moving up the tree until either the root or a join node (if a set of join nodes is specified) is reached. It is used by the algorithms for single value change and for transactional change. Note that keyUpdates and keyrefUpdates are calculated using getKeyAndKeyrefUpdates( ).

```
def updatePathToJoinNode(startNode, startChild, startChangesInChild,
                        joinNodes, keyUpdates,
                        keyrefUpdates):
    currentNode = startNode
    currentChild = startChild
    changesInChild = startChangesInChild
    while not(isinstance(currentNode,Document)) and
            not(joinNodes.has_key(currentNode)):
        changeList=None
        if changesInChild!=None:
            changeList = [(currentChild, changesInChild)]
        changesInChild = updateNodeK(currentNode, changeList,
        keyUpdates)
        removedSequences=getRemovedSequences(changesInChild)
        updateNodeKR(currentNode, removedSequences,
        keyrefUpdates)
        currentChild = currentNode
        currentNode = currentNode.parent
    return (currentChild,changesInChild)
```

A.1.5 updateNode( )

This function updates the data structures pertaining to key constraints which are associated with a single node (keyTabs, ChildrenKeyInfo).

```
def updateNodeK(node, changesInChildren, keyUpdates):
    if len(node.keyTabs)==0 and changesInChildren==None:
        return None
    changes={ }
    ###############################################################
    # process changes in children
    ###############################################################
    if changesInChildren!=None and changesInChildren!=[ ]:
        # We go over all existing key constraints
        for key in KeySelIdent.keys( ):
            changesForKey={ }
            # key-sequences for which we need to change childrenInfo
            childrenInfoChangedSequences={ }
            for (child,changesInChild) in changesInChildren:
                if changesInChild.has__key(key):
                    if not(node.childrenInfo.has__key(key)):
                        node.childrenInfo[key]={ }
                    childrenInfo = node.childrenKeyInfo[key]
                    for (ks,n) in changesInChild[key].items( ):
                        # value for ks is irrelevant, we just want to
                        # know if it's there
                        childrenInfoChangedSequences[ks]=None
                        if not(childrenInfo.has__key(ks)):
                            childrenInfo[ks]={ }
                        if (n!=None):
                            childrenInfo[ks][child]=n
                        else:
                            if childrenInfo[ks].has__key(child):
                                del childrenInfo[ks][child]
            if childrenInfoChangedSequences!={ }:
                if not(node.keyTabs.has__key(key)):
                    node.keyTabs[key]={ }
                keyTab = node.keyTabs[key]
                for ks in childrenInfoChangedSequences.keys( ):
                    if keyTab.has__key(ks):
                        if keyTab[ks][i]==True:
                            # we don't touch a selectorIdentified entry
                            continue
                        else:
                            old = keyTab[ks][0]
                            del keyTab[ks]
                            addKeyTabsRollbackInfo(node,key,ks,old,False)
                            changesForKey[ks]=None
                    if len(childrenInfo[ks])==1:
                        # ks appears once in the children's data structures
                        nodeInChild=childrenInfo[ks].values( )[0]
                        keyTab[ks]=(nodeInChild,False)
                        # note: if we removed a row in the previous 'if'
                        # then we already added to rollbackinfo and
                        # the following line will not do anything
                        addKeyTabsRollbackInfo(node,key,ks,None,None)
                        changesForKey[ks]=nodeInChild
                    if childrenInfo[ks]=={ }:
                        del childrenInfo[ks]
            if changesForKey!={ }:
                changes[key]=changesForKey
    ###############################################################
    #process keyUpdates
    ###############################################################
    for (key,updatesForKey) in keyUpdates.items( ):
        if not(node.keyTabs.has__key(key)):
            node.keyTabs[key]={ }
        keyTab = node.keyTabs[key]
        if not(node.childrenInfo.has__key(key)):
            node.childrenInfo[key]={ }
        childrenInfo = node.childrenInfo[key]
        if not(changes.has__key(key)):
            changes[key]={ }
        changesForKey=changes[key]
        # updates (n,(oldSeq,newSeq)) in updatesForKey where the node n is
        # a selector-identified node of the 'node' parameter of updateNodeK( ).
        relevantUpdates={ }
        for (n,(oldSeq,newSeq)) in updatesForKey.items( ):
            if keyTab.has__key(oldSeq) and keyTab[oldSeq]==(n,True):
                relevantUpdates[n]=(oldSeq,newSeq)
        #dealing with old sequences
        for (n,(oldSeq,newSeq)) in relevantUpdates.items( ):
            #remove n from keyTab, possibly replacing it with a child record
            if childrenInfo.has__key(oldSeq) and len(childrenInfo[oldSeq])==1:
                nodeInChild=childrenInfo[oldSeq].values( )[0]
```

```
            keyTab[oldSeq]=(nodeInChild,False)
            changesForKey[oldSeq]=nodeInChild
        else:
            del keyTab[oldSeq]
            changesForKey[oldSeq]=None
        addKeyTabsRollbackInfo(node,key,oldSeq,n,True)
    #dealing with new sequences
    for (n,(oldSeq,newSeq)) in relevantUpdates.items( ):
        # Get the current entry for newSeq in keyTab, if one exists.
        oldNode=None
        oldBool=None
        if keyTab.has_key(newSeq):
            oldNode=keyTab[newSeq]
            oldBool=False
            if keyTab[newSeq][1]==True:
                raise "Duplicate key sequence for Key "
                    + repr(key.name) + ": " + repr(newSeq)
        keyTab[newSeq]=(n, True)
        addKeyTabsRollbackInfo(node,key,newSeq,oldNode,oldBool)
        changesForKey[newSeq]=n
    if changesForKey=={ }:
        del changes[key]
if (changes=={ }):
    return None
return changes
```

A.1.6 updateNodeKR( )

This function updates the KeyrefInfo structure of a single node, and makes sure that for every key-sequence of a keyref selector-identified node there is a corresponding entry in the keyTabs data structure.

```
def updateNodeKR(node, removedSequences, keyrefUpdates):
    ####################################################
    # make sure every new sequence has a match,
    # and update the sequences in KeyrefInfo
    ####################################################
    for (keyref,updates) in keyrefUpdates.items( ):
        if not(node.KeyrefInfo.has_key(keyref)):
            continue
        keyrefInfo=node.KeyrefInfo[keyref]
        keyTab = node.keyTabs[keyref.refer]
        for (n,(oldSeq,newSeq)) in updates.items( ):
            if keyrefInfo.has_key(n):
                # (relevant update)
                if not(keyTab.has_key(newSeq)):
                    raise "New keyr11ef sequence for Keyref" +
                        repr(keyref.name) +
                        " has no matching key: " + repr(newSeq)
                keyrefInfo[n]=newSeq
                keyrefInfo[newSeq]=keyrefInfo.get(newSeq,0)+1
                keyrefInfo[oldSeq]=keyrefInfo[oldSeq]-1
                if (keyrefInfo[oldSeq]<1):
                    del keyrefInfo[oldSeq]
                addKeyrefInfoRollbackInfo(node,keyref,n,oldSeq)
    ####################################################
    #check that there are no references to removed sequences
    ####################################################
    for (key,removedForKey) in removedSequences.items( ):
        for (keyref,keyrefInfo) in node.KeyrefInfo.items( ):
            if keyref.refer==key:
                for ks in removedForKey:
                    if keyrefInfo.has_key(ks):
                        raise "Removed key sequence has a referencing
                            node " + "in Keyref" +
                            repr(keyref.name) + ": " + repr(ks)
return
```

Although the invention has been described in detail, nevertheless changes and modifications, which do not depart from the teachings of the present invention, will be evident to those skilled in the art. Such changes and modifications are deemed to come within the purview of the present invention and the appended claims.

REFERENCES AND BIBLIOGRAPHY

[1] T. Bray, J. Paoli, and C. M. Sperberg-McQueen (Eds). Extensible Markup Language (XML) 1.0 (2nd Edition). W3C October 2000. http://www.w3.org/TR/2000/REC-xml-20001006.

[2] W3C XML Schema. http://www.w3.org/XML/Schema.

[3] Xml Path Language (XPath) Version 1.0 W3C Recommendation http://www.w3.org/TR/xpath.

[4] XML Schema Part 1: Structures Second Edition. http://www.w3.org/TR/xmlschema-1.

[5] Michael Benedilkt, Chee-Yong Chan, Wenfei Fan, Juliana Freire, Rajeev Rastogi. Capturing both Types and Constraints in Data Integration. SIGMOD 2003, p. 277-288.

[6] Denilson Barbosa, Alberto O. Mendelzon, Leonid Libkin, Laurent Mignet, Marcelo Arenas. E_cient Incremental Validation of Documents. ICDE 2004, p. 671-682.

[7] Georg Gottlob, Christoph Koch, Reinhard Pichler. E_cient Algorithms For Processing XPath Queries. VLDB 2002, p. 95

[8] W3C Document Object Model. www.w3.org/DOM/

[9] Y. Papakonstantinou, V. Vianu. Incremental Validation of XML Documents. ICDT 2003, p. 47-63.

[10] Denilson Barbosa, Alberto O. Mendelzon, Leonid Libkin, Laurent Mignet, Marcelo Arenas. E_cient Incremental Validation of XML Documents. ICDE 2004, p. 671-682.

[11] XSV (XML Schema Validator). http://www.ltg.ed.ac.uk/ht/sxv-status.html

The invention claimed is:

1. A method for updating an XML document in a computer and validating the update in an incremental fashion with respect to XML schema key and keyref constraints, said method comprising:
   (i) defining an XML schema comprising key and keyref constraints, wherein each keyref constraint refers to a key constraint in a scoping element, by specifying the key constraint's name;

(ii) validating an XML document conforming to the XML schema and comprising a key element and a keyref element in accordance with the key and keyref constraints;

(iii) building a data structure for capturing the state of the XML document with respect to key and keyref constraints to enable efficient monitoring as the XML document changes;

(iv) specifying an update, including one or more operations, to be made to the XML document;

(v) determining based on the data structure, specified update and relevant key or keyref constraints the parts of the XML document that may be affected by said update;

(vi) verifying by scanning only the parts of the XML documents determined in step (v) that said update does not violate any key or keyref constraints; and (vii) performing said update only after the verification of (vi) is successful; and (viii) updating the data structure with the update information.

2. A method according to claim 1, wherein said one or more operations include: (a) adding a new node; (b) deleting a node; (c) changing the value of a node; (d) moving a node to a new location; (e) copying a node to a new location; (f) adding a new subtree; (g) deleting a subtree; (h) moving a subtree to a new location; and (i) copying a subtree to a specified location.

3. A method according to claim 1, wherein only the portions of said XML document that are identified as potentially affected by the update are examined.

4. A method according to claim 1, wherein said XML schema includes key constraints, and said update to the XML document is verified so it does not violate any key constraints.

5. A method according to claim 1, wherein said XML schema includes key and keyref constraints, and said update to the XML document is verified so it does not violate any key or keyref constraints.

6. A method according to claim 1, wherein said XML schema includes unique constraints, and said update to the XML document is verified so it does not violate any unique constraints.

7. A method according to claim 1, wherein data structures are maintained, said data structures designed to enable efficient monitoring as the XML document changes and holding information relevant to the validation of key, keyref and unique constraints.

8. A method according to claim 7, wherein said data structures identify which selector-identified nodes are affected by changing a simple-type node.

9. A method according to claim 7, wherein said data structures identify whether a given node is a selector-identified node and of which scoping nodes.

10. A method according to claim 7, wherein said data structures keep the key-sequence of each selector-identified node only once.

11. A method according to claim 7, wherein particular data structures for a given node enable an easy update of the data structure of said given node following an update to one or more of said given node's children's data structures.

12. A method according to claim 11, wherein particular data structures are ChildrenKeyInfo data structures.

13. A system for updating an XML document in a computer and validating the update in an incremental fashion with respect to XML schema key and keyref constraints, said system comprising:

(i) an XML schema comprising key and keyref constraints, wherein each keyref constraint refers to a key constraint in a scoping element, by specifying the key constraint's name;

(ii) an XML document validated as conforming to the XML schema and comprising a key element and a keyref element in accordance with the key and keyref constraints;

(iii) a data structure for capturing the state of the XML document with respect to key and keyref constraints to enable efficient monitoring as the XML document changes;

(iv) an update, including one or more operations, to be made to the XML document;

(v) means for determining based on the data structure, specified update and relevant key or keyref constraints the parts of the XML document that may be affected by said update;

(vi) means for verifying by scanning only the parts of the XML documents determined in (v) that said update does not violate any key or keyref constraints; and (vii) means for performing said update only after the verification of (vi) is successful; and (viii) means for updating the data structure with the update information.

14. A system according to claim 13, wherein said one or more operations include: (a) adding a new node; (b) deleting a node; (c) changing the value of a node; (d) moving a node to a new location; (e) copying a node to a new location; (f) adding a new subtree; (g) deleting a subtree; (h) moving a subtree to a new location; and (i) copying a subtree to a specified location.

15. A system according to claim 13, wherein only the portions of said XML document that are identified as potentially affected by the update are examined.

16. A system according to claim 13, wherein said XML schema includes key constraints, and said update to the XML document is verified so it does not violate any key constraints.

17. A system according to claim 13, wherein said XML schema includes key and keyref constraints, and said update to the XML document is verified so it does not violate any key or keyref constraints.

18. A system according to claim 13, wherein said XML schema includes unique constraints, and said update to the XML document is verified so it does not violate any unique constraints.

19. A system according to claim 13, wherein data structures are maintained, said data structures designed to enable efficient monitoring as the XML document changes and holding information relevant to the validation of key, keyref and unique constraints.

20. A system according to claim 19, wherein said data structures identify which selector-identified nodes are affected by changing a simple-type node.

21. A system according to claim 19, wherein said data structures identify whether a given node is a selector-identified node and of which scoping nodes.

22. A system according to claim 19, wherein said data structures keep the key-sequence of each selector-identified node only once.

23. A system according to claim 19, wherein particular data structures for a given node enable an easy update of the data structure of said given node following an update to one or more of said given node's children's data structures.

24. A system according to claim 23, wherein particular data structures are ChildrenKeyInfo data structures.

25. A method for validating an XML document in a computer with respect to XML schema key and keyref constraints, said method comprising:
  (i) defining an XML schema comprising key and keyref constraints, wherein each keyref constraint refers to a key constraint in a scoping element, by specifying the key constraint's name;
  (ii) validating an XML document conforming to the XML schema and comprising a key element and a keyref element in accordance with the key and keyref constraints;
  (iii) building a data structure for capturing the state of the XML document with respect to key and keyref constraints to enable efficient monitoring as the XML document changes;
  (iv) specifying an update, including one or more operations, to be made to the XML document;
  (v) determining based on the data structure, specified update and relevant key or keyref constraints the parts of the XML document that may be affected by said update;
  (vi) verifying by scanning only the parts of the XML documents in step (v) that the entire XML document including said update does not violate any key or keyref constraints; and
  (vii) performing said update only after the verification of (vi) is successful, otherwise undoing said update;
  (viii) updating the data structure with the update information.

* * * * *